US006754664B1

(12) United States Patent
Bush

(10) Patent No.: US 6,754,664 B1
(45) Date of Patent: Jun. 22, 2004

(54) SCHEMA-BASED COMPUTER SYSTEM HEALTH MONITORING

(75) Inventor: Eric N. Bush, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/513,812

(22) Filed: Feb. 25, 2000

Related U.S. Application Data

(60) Provisional application No. 60/142,209, filed on Jul. 2, 1999.

(51) Int. Cl.[7] .................................................. G06F 7/00
(52) U.S. Cl. ...................................... 707/102; 709/223
(58) Field of Search ................. 345/349; 709/223–224; 707/100–105

(56) References Cited

U.S. PATENT DOCUMENTS

| | | | | |
|---|---|---|---|---|
| 5,974,457 A | * | 10/1999 | Waclawsky et al. | ........... 706/46 |
| 6,182,022 B1 | * | 1/2001 | Mayle et al. | ............... 702/182 |
| 6,272,537 B1 | * | 8/2001 | Kekic et al. | ................. 709/203 |
| 6,370,482 B1 | * | 4/2002 | Wirth | .......................... 340/539 |

* cited by examiner

*Primary Examiner*—Greta Robinson
*Assistant Examiner*—S R Pannala
(74) *Attorney, Agent, or Firm*—Law Offices of Albert S. Michalik, PLLC

(57) ABSTRACT

A hierarchical, object-oriented definition of the health of resources on a machine or network. A schema of objects is defined to represent machine and/or network health. One class of objects defines DataGroups that can be nested to represent machine resources. In addition to DataGroup objects, three other types of objects are defined in the schema, namely DataCollectors, Thresholds and Actions. DataCollectors are objects that when instantiated, collect data by polling or event notification. Threshold class objects as defined in the schema are associated with the DataCollector objects, and each provides the threshold or thresholds against which a DataCollector's collected data is evaluated. Action objects specify what happens when a Threshold is violated, such as to send an e-mail, page someone, run a script, execute a command, or send a message alert to a console for an operator to see.

56 Claims, 11 Drawing Sheets

```
instance of HMDataGroup
    {
    iCategory       = 1;              // Id to identify the category
    Category        = "Processor";    // String name for the category
    CatRID          = 3262;           // Resource ID so that the string name can be
                                      // localized into any language
    Enable          = 1;              // Specifies if this category is currently active
    DescriptionID   = 3101;           // Resource ID for the localized description
    ResourceFile    = "hmres.dll";    // Where to get the localized strings from
    };

instance of HMDataCollector
    {
    NamespaceName   = "healthmon";    \\ Where to collect the data from
    ClassName       = "HMProcPerf";   \\ Name of class to collect
    InstanceName    = "";             \\ If a specific instance is being looked for
    PropName        = "TotProcTimeP"; \\ Name of a property on the collected instance to
                                      \\ verify
    MultiInstance   = TRUE;           \\ If it is desired to look at all instances at once
    CheckEveryNPolls= 1;              \\ How often to collect and verify
    Name            = "Percent Total System Time";   \\ English name
    NameID          = 3232;           \\ Resource ID for localized name
    Counter         = "Processor|% Processor Time";  \\ Human readable name of
                                                     \\ performance counter
    iCategory       = 1;              \\ What category this DataPoint belongs to
    Category        = "Processor";    \\ String of what category this belongs to
    };

instance of HMDataThreshold
    {
    CriticalValue    = 80;            \\ Value to verify against to determine critical state
    CriticalTest     = ">";           \\ The test to apply to the collected value
    CriticalDuration = 300;           \\ How long the value must persist to be in the
                                      \\ violated state
    RearmC           = 70;            \\ value that can set the DataPoint back to the
                                      \\ normal state
    RearmCTest       = "<";           \\ Test to apply to verify the normal state
    WarningValue     = 70;            \\ Value to verify against to determine warning state
    WarningTest      = ">";           \\ The test to apply to the collected value
    WarningDuration  = 300;           \\ How long the value must persist to be in the
                                      \\ violated state
    RearmW           = 60;            \\ value that can set the DataPoint back to the
                                      \\ normal state
    RearmWTest       = "<";           \\ Test to apply to verify the normal state
    RateTest         = 0;             \\ Specifies if we are looking at a value straight, or
                                      \\ the difference between previously collected
                                      \\ values
    ResourceFile     = "hmres.dll";   \\ Location of localized strings
    EventBased       = FALSE;         \\ Specifies the use of event based monitoring,
                                      \\ instead of polling
    };
```

*FIG. 5*

SCHEMA-BASED COMPUTER SYSTEM HEALTH MONITORING

REFERENCE TO RELATED APPLICATION

This application claims the benefit of U.S. Provisional Application No. 60/142,209 filed Jul. 2, 1999, and incorporated herein by reference.

FIELD OF THE INVENTION

The present invention generally relates to computer systems, and more particularly to monitoring the state of various resources in a computer system.

BACKGROUND OF THE INVENTION

Network management is the process of controlling a complex data network to maximize its efficiency and productivity. Network management can include, for example, the process of locating problems, or faults, on a data network. It can also include measuring the performance of network hardware, software, and media. Individual and group user's utilization of network resources can be tracked to better ensure that users have sufficient resources.

As networks become increasingly more sizable and complex, the need has grown for centralized and simplified network management. Existing network administrators often manually verify or run scripts to evaluate the state (i.e., health) of resources on network machines, e.g., to inspect free disk space to see if disk space is getting low, or CPU utilization to see if loads need to be distributed to other machines. The information is maintained in various databases and flat tables that are separate, unstructured, and difficult to evaluate. There exists a need for a more sophisticated and organized way to model, access and evaluate machine data in order to monitor the health of resources on a network.

SUMMARY OF THE INVENTION

The present invention provides a hierarchical, object-oriented definition of the health of resources on a machine or network. To this end, a schema of objects is defined to represent machine and/or network health. One class of objects defines data groups (DataGroups) that can be nested to represent machine resources. DataGroups act essentially as folders to contain DataCollectors. For example, one DataGroup object may represent machine software, with DataGroups under it representing processes and services. Another DataGroup may represent machine hardware, with other DataGroups, hierarchically below the machine hardware DataGroup, representing one or more disk drives, processors, memory and so forth.

In addition to DataGroup objects, three other types of objects are defined in the schema, namely DataCollectors, Thresholds and Actions. DataCollectors are objects that when instantiated, collect data from a DataGroup resource (e.g., via Microsoft® Corporation's Windows Management Instrumentation (WMI)) by polling or event notification. For example, there can be a DataCollector for LogicalDisk information that collects the information about a logical disk that is to be monitored. DataCollector properties include a collection interval, i.e., how often to go ask for the data, scheduling, e.g., the days and hours that the DataCollector is active, and path information, i.e., where to obtain the data, and how to obtain the data (via polling or event based notification). DataCollectors may specify WMI queries in their respective properties, or specify WMI polled methods.

Threshold class objects as defined in the schema are associated with the DataCollector objects, and each essentially provides the threshold or thresholds (rules) against which a DataCollector's collected data is evaluated. Threshold properties specify how to use the collected data, e.g., its current value, average value, or a difference between collections. Another property specifies the test condition to apply, such as less than, greater than, equal, not equal, contains or does not contain. Other Threshold properties may be used to specify a duration specifying how long a value should remain in violation of a Threshold before it is considered an actual violation.

Dynamic multi-instance thresholding is also provided, wherein a DataCollector will go out and dynamically discover resources, (e.g., running processes), go out and collect the resources' data, and apply Thresholds to the collected data. As a result, prior knowledge of resources (e.g., the identity of the processes running at any given time) is not required to monitor those resources.

Action objects specify what happens when a Threshold is violated, such as to send an e-mail, page someone, run a script, execute a command, or send a message alert to a console for an operator to see. Actions may be throttled, for example, to limit the paging of someone to only once per hour. Action objects may be attached anywhere in the hierarchy, and threshold violation events roll-up the hierarchy to trigger the actions. Thus, for example, a first action can be set so as to page a first administrator on detection of low disk space, while a second action may be set at the system hardware level (hierarchically above the disk level) so as to e-mail a second administrator of the problem, whereby the single threshold violation of the specified Threshold cause an event that triggers both Actions.

Other advantages will become apparent from the following detailed description when taken in conjunction with the drawings, in which:

BRIEF DESCRIPTION OF THE DRAWINGS

FIG. 5 is a representation of instances of DataGroup, DataCollector and Threshold objects in accordance with one aspect of the present invention;

DETAILED DESCRIPTION

Exemplary Operating Environment

Figure 1:
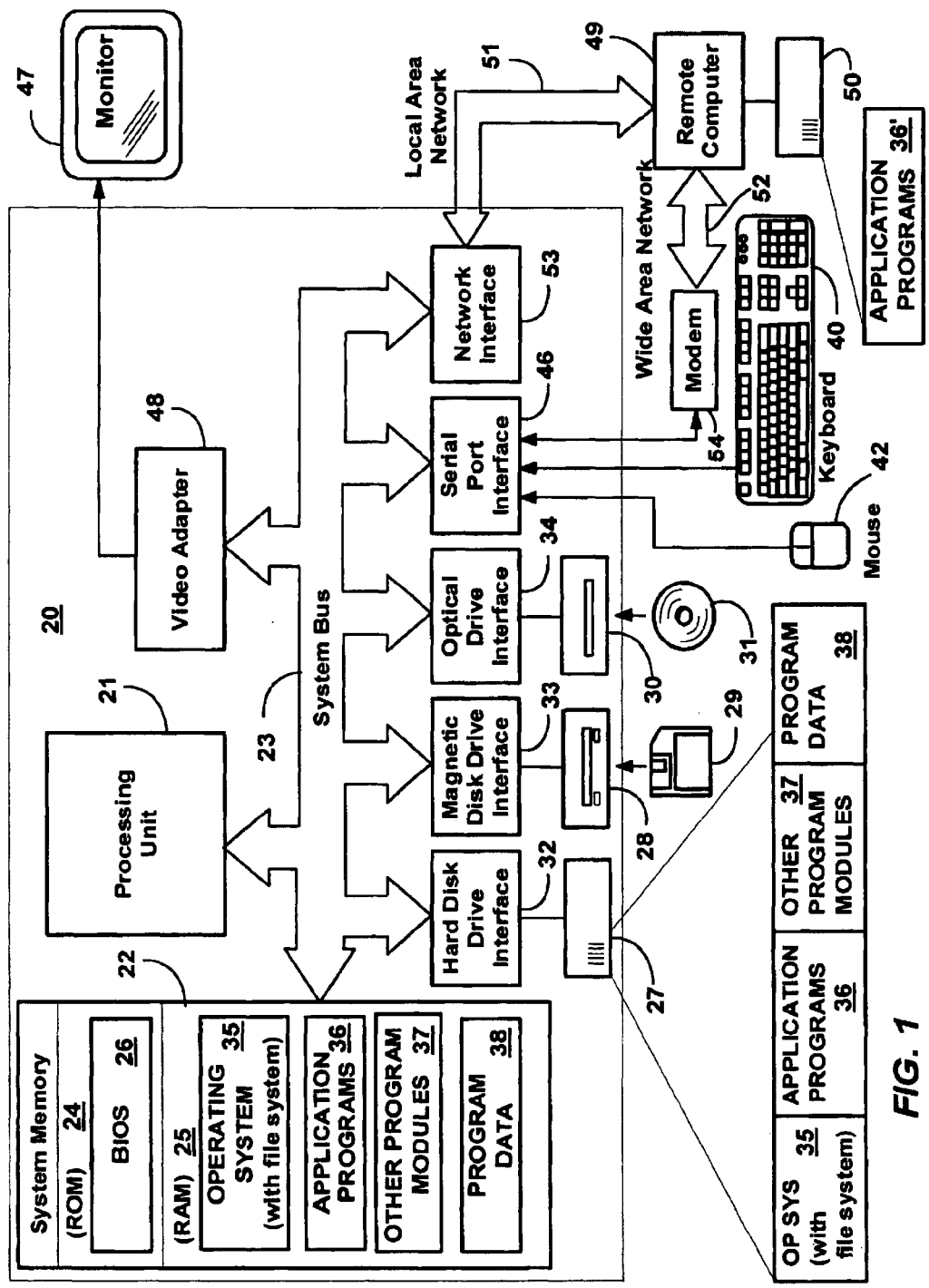
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The-personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Schema-based Computer System Health Monitoring

Figure 2:
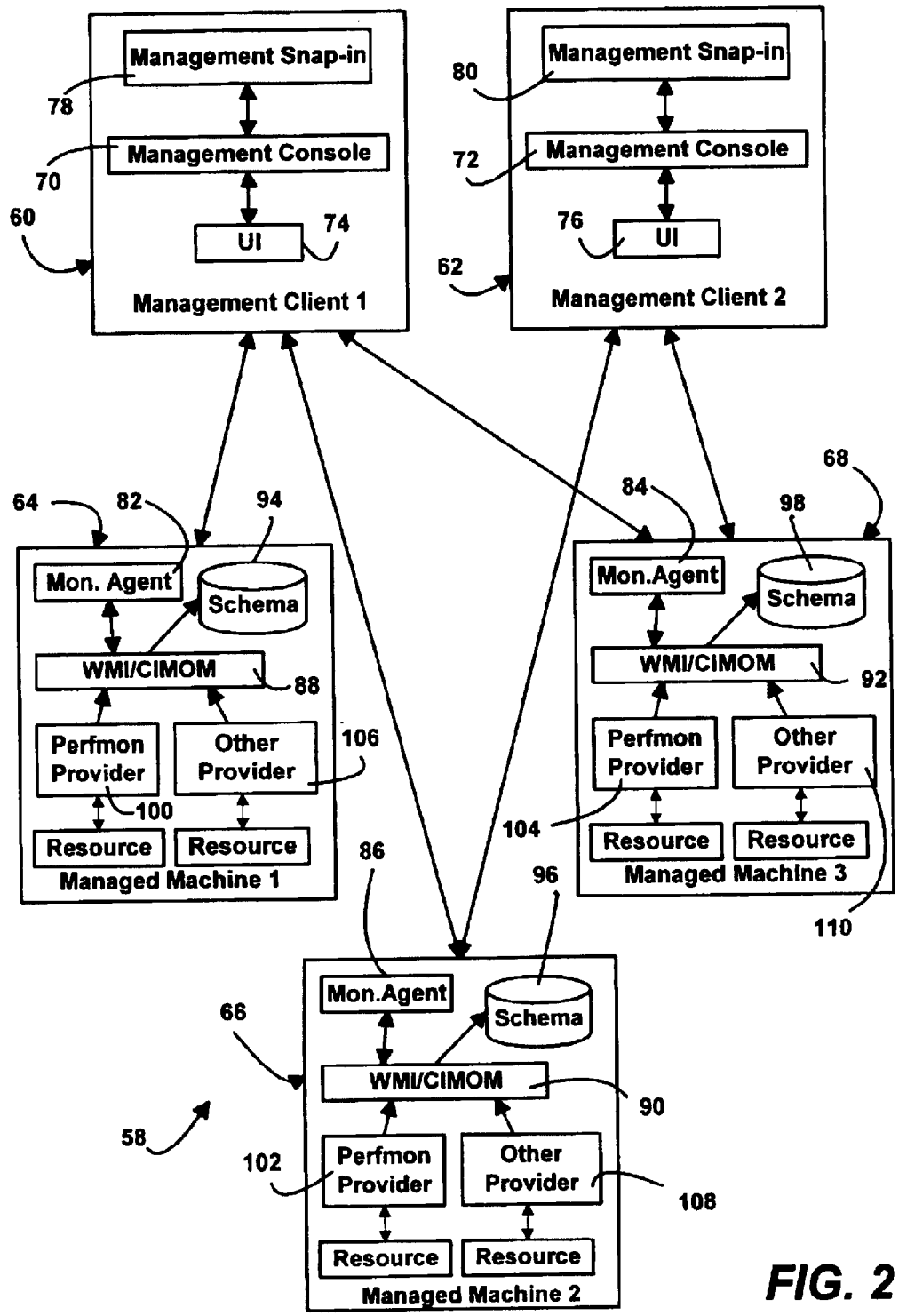
FIG. 2 is a block diagram representing a general architecture for monitoring the health of a computer system in accordance with one aspect of the present invention.

A general architecture for a schema-based computer health monitoring system 58 in accordance with one aspect of the present invention is shown in FIG. 2. As shown in FIG. 2, one or more management clients 60 and 62 are configured to monitor the health of one or more managed resources on networks or machines 64, 66 and 68. In the example shown, the management client 60 monitors the resources associated with the managed machines 64, 66, and 68, and the management client 62 monitors the resources associated with the managed machines 66 and 68. By way of example, the management client 60 may monitor all machines (e.g., the managed machines 64, 66) within a specific department, (e.g. Accounting), while the management client 62 may monitor all corporate e-mail servers, (e.g., the managed machines 64, 66, and 68).

Although the example shown in FIG. 2 depicts management clients 60 and 62 that monitor three and two of the managed machines 64, 66, and 68, respectively, a management client in accordance with the present invention is configurable to monitor one machine or virtually any number of machines. Moreover, although the managed machines 64, 66, and 68 are referred to as "machines" herein, the present invention may be used to monitor resources at any level, such as individual resources, or networks comprising several machines and/or resources. In addition, although the management clients and the managed machines are each depicted herein as being separate machines, one or more of the various machines 60–68 may be on a same machine, and/or components of each may be present on one machine or distributed across several machines.

In any event, a general architecture of a CIM (Common Information Model) installation incorporating the present invention is shown in FIG. 2, wherein the management clients 60 and 62 respectively include management consoles 70 and 72, user interfaces 74 and 76, and management snap-ins 78 and 80. In a preferred embodiment, each of the management consoles 70 and 72 is an extensible console framework that does not provide management functionality by itself. Instead, management functionality is provided by software modules that are called "snap-ins" (e.g., the management snap-ins 78 and 80). Snap-ins can be developed by the developer of the operating system or by independent software vendors (ISVs). Snap-ins are management functionality components that are integrated into the management console. Each snap-in provides one unit of management behavior. Technically, a snap-in is a Component Object Model (COM) In-proc server that executes in the process context of the management console. The snap-in may call on other supporting controls and dynamic link libraries (DLLs) to accomplish its tasks. The use of snap-ins in a common console framework allows a system administrator to extend and customize the console to meet specific management objectives.

For example, the management consoles 70 and 72 preferably utilize the Microsoft® Management Console (MMC) common console framework, which is a common console framework for management applications. Each of the MMCs 70 and 72 organizes and coordinates the management snap-ins 78 and 80 and provides the user interfaces 74 and 76, through which an administrator can invoke the management snap-ins to provide their respective management behavior. Sample displays provided by the user interfaces are described below.

The management clients 60 and 62 are connected to the managed machines 64, 66 and 68 via a corporate intranet, a WAN connection such as the Internet, or the like. A dedicated connection may be provided. Alternatively, as health information is available from the managed machines, a connection may be established via a dial-on-demand WAN connection, for example. Such a dial-on-demand connection provides a short term connection for delivering necessary information to the management client 60 or 62.

In one preferred implementation, the managed machines 64, 66 and 68 each include a monitoring agent 82, 84 and 86, respectively, for performing health monitoring functions, as described below. The agents 82, 84 and 86 are preferably in-process dynamic link libraries (DLLs) upon which the management snap-ins 78 and 80 call (e.g., via WMI) to accomplish their tasks. Alternatively, the agents may be any other mechanisms such as controls.

The agents 82, 84 and 86 are each associated with a WMI/Common Information Model Object Manager (CIM Object Manager, or WMI CIMOM) 88, 90 and 92, respectively. The Common Information Model (CIM) is platform independent, and presents a consistent and unified view of various types of logical and physical objects in a managed environment. Managed objects are represented using object-oriented constructs such as classes. The classes include properties that describe data and methods that describe behavior. In general, in a CIM installation, a process acting in the role of a client makes management requests, while one or more provider processes acting as servers satisfies each requested task, and CIM returns an appropriate response to the client via a uniformly rendered managed object. WMI, the CIM and the CIMOM are described in U.S. patent application Ser. No. 09/020,146, entitled "Object Manager for Common Information Model", and incorporated herein by reference. Although the present invention is primarily described herein as operating in conjunction with Web-Based Enterprise Management (WBEM) and WMI/CIM, the present invention is equally applicable to other management systems, and thus the references herein to WMI/CIM management system are for illustrative purposes only, and do not limit the applicability of the invention.

In accordance with one aspect of the present invention and as further described below, a schema 94, 96 and 98 of objects is defined for each managed machine 64, 66 and 68, respectively. Each schema 94, 96 or 98 represents the definition of the health of resources on the respective managed machine 64, 66, or 68. The schemas 94, 96 and 98 are data representation formalisms (object classes) containing the management information looked at by the management snap-ins 78 and 80. In the embodiment shown in FIG. 2, the schemas 94, 96 and 98 are stored in association with the WMI/CIMOMs 88, 90 and 92, e.g., in a CIMOM repository. However, if desired, the schemas 94, 96 and 98 may be stored in other locations, such as in a registry or in a table, for example.

In accordance with another aspect of the present invention, using its corresponding schema, a general process performed by each agent (such as the agent 82) includes collecting an instance from the WMI/CIMOM 88, and applying some rule against a property in the instance. The schema 94 specifies the details for collecting the instance, (e.g., how, when and where), the Threshold to apply, and what to do if the Threshold is violated. If the Threshold was violated, the agent 82 fires an event, which may modify the display in the console user interface 74, as described below. The threshold violation may also cause some action to take place, as also described below. By way of example, consider a collected instance of the amount of free disk space. A Threshold may be specified that checks the free space to determine if it goes below five percent of the total disk space. If the Threshold was violated, i.e., the free space is below five percent, then an event is generated. Further, an action may occur, such as sending an electronic page to an administrator of the system.

Figure 3:
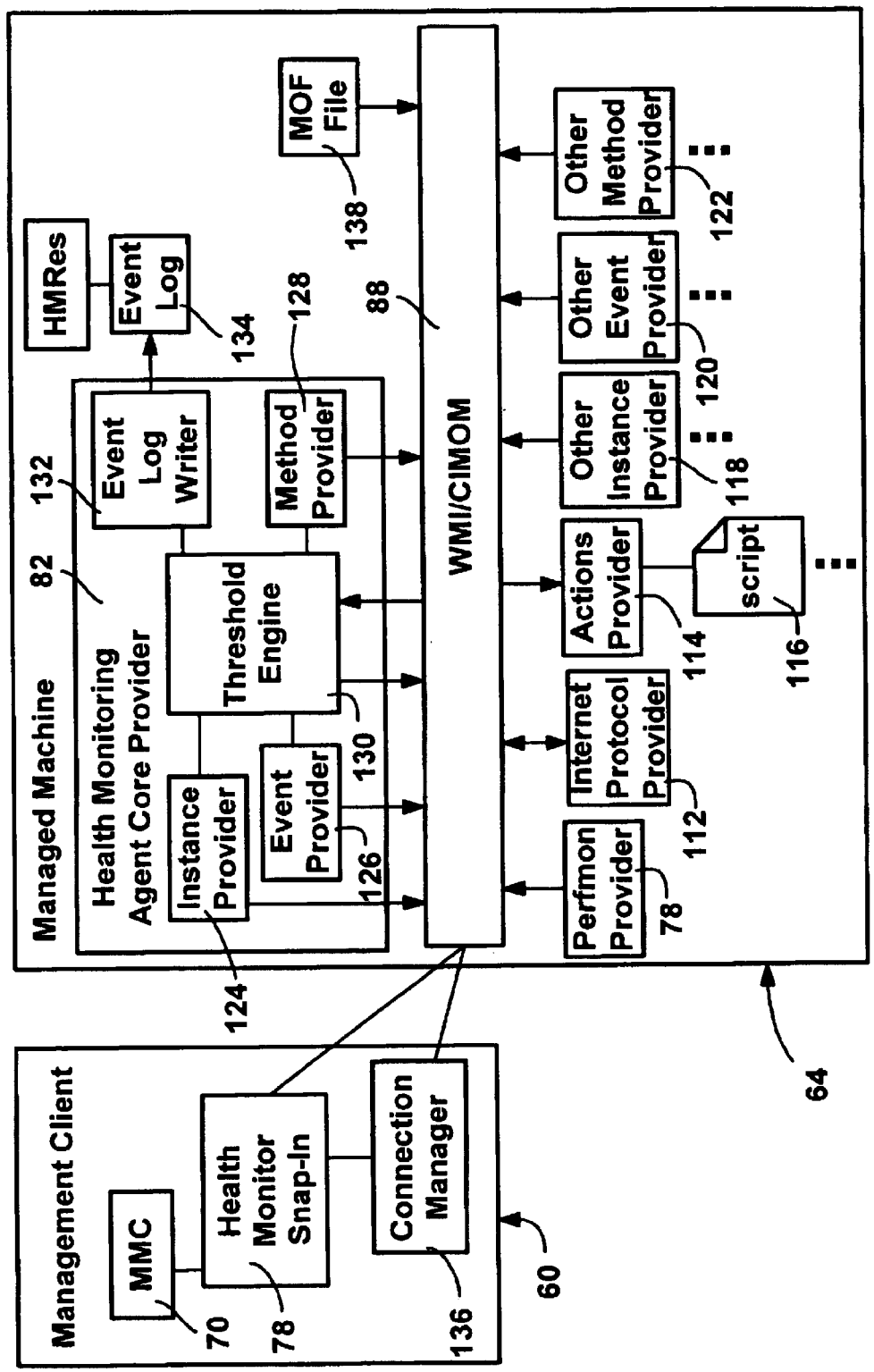
FIG. 3 is a block diagram representing components of the architecture for monitoring the health of a computer system in accordance with one aspect of the present invention.

To collect the data, apply the Thresholds and fire events, FIG. 3 generally shows an expanded view of the monitoring agent components in a single console machine and managed server machine, such as the machines 60 and 64 of FIG. 2, including those within a health monitoring agent core provider such as the monitoring agent 82. The health monitoring agent 82 is an in-process DLL to the WMI component 88, and is only loaded and run when the WMI 88 is started. Once loaded, the health monitoring agent 82 ordinarily stays loaded, and its main thread run continuously.

The agent 82 runs on the managed system 64, and interacts locally with the WMI/CIMOM component 88 in order to accommodate a number of functions. For example, the agent 82 provides up-time statistics for each managed system, in addition to percentage of up-time attributed to each operational severity level for each managed object (e.g., the percentage of time the processor or a SQL server has been in a critical severity level).

Whenever the agent 82 is notified as a consumer of a WMI event, the agent 82 looks up in the WMI 88 to determine which machines are active and are interested in the status notification, whereby, for example, a status change (e.g., a color change) is sent to the appropriate console or consoles. More particularly, the agent 82 communicates with the console 70 by placing events and instance data into the WMI 88 by acting as a provider. At the lowest level, this results in data being sent to the console 70, such as via DCOM. Thus, at install time, the agent core provider DLL is registered (via standard COM registry techniques), along with helper provider DLLs, described below.

Within the console, status changes are reflected for that machine, as well as the managed object group where the change occurred. If no consoles need to be notified (e.g., the list of active machines is empty), then no console notification needs to take place, however, event logs are written. To prevent the event log from being written, a console needs to specifically request that queries be taken off a managed machine. Note that each agent such as the agent 82 maintains the current state of the managed objects (processor, memory, IIS and so forth) locally. If a second console such as the console 62 indicates that it wants to view status, the agent will transfer the current states to the console, whereby the consoles will be in synchronization. Further note that each agent is running on its own, on a single server, and does not require an operational console, or even ever really know whether a console is looking at it. The agent keeps evaluating thresholds and generating events, and responding with actions. Indeed, a general design of health monitoring utilizes "Push" technology, i.e., in most cases, data is pushed to the console, not retrieved by the console.

As also represented in FIG. 3, via the console machine 60 and the management console (MMC) 70, the operator uses the SnapIn component 78 to add managed machines and edit their configuration settings, i.e., schemas. Once configured, an agent of a managed machine (e.g., 64) may run the DataCollectors and Thresholds as set forth in the corresponding local schema 94, and produce events as described below. Operators of the console machine 60 then may use the monitoring Snap-In 78 to view the state and status of the managed machine, as described below.

The architecture is modular, with the agent 82 performing the data collection and rule checking (thresholding). More particularly, the core agent provider 82 collects data, thresholds against it, and appropriately sends out events and group status information for the console 70 to consume. Note that the agent 82 thus ends up being a producer and a consumer of WMI events and instances. As shown in FIGS. 2 and 3, providers may include Perform (performance monitoring) providers 100, 102 and 104, and other providers 106, 108, 110, such as an Internet Protocol Provider 112, which provides a Protocol interface (e.g., it supports HTTP, PING, SMTP and FTP) to connect to a port and issue commands, and returns as a property the return value from the command. Other providers include an Actions provider 114 that consumes health monitoring events and initiates actions, such as by running scripts 116. Other providers (e.g., 118, 120 and 122) may be present in a given server machine 64.

To collect data, the agent 82 includes instance, event and method providers 124, 126 and 128, respectively, as described below. The agent 82 also includes a threshold engine 130 that evaluates the collected data against a threshold or thresholds, as also described below. The agent 82 also includes an event log writer 132 that writes selected events to a local event log 134 of the managed system 64, noting the time and cause of a status change. The agent 82 also provides a current operational status for the managed objects to any new console sessions, i.e., to bootstrap new consoles as they come-up with the current state of managed objects for managed systems.

Other features supported by health monitoring do not necessarily require any code in the agent. For example, a console machine connection manager 136 maintains availability status information on each system that the console 70 is monitoring, and is also responsible for the communication with those systems. The connection manager 136 may comprise a local COM server, and may provide "heart beating" to ensure that WMI temporary event consumers are re-registered when WMI is stopped, such as if the system is rebooted or network connectivity with the remote system is interrupted. In Heart Beating, the connection manager 136 of the console machine 60 checks to see if an agent machine (e.g., 82) is capable of communication. Heart beating can alternatively be accomplished by having a single machine proxy for several other machines, and check some known property on them every few minutes. If the machine cannot be reached to get the property, then a network or other problem is possible.

In keeping with the present invention, in one preferred implementation, health monitoring works with one or more MOF (managed object format) files 138 of the schema 94. The MOF files 138 get compiled and placed into the WMI schema 94 when health monitoring is installed on the server machine 64. The MOF file 138 represents a health monitoring namespace that essentially represents the monitoring policy for a given machine.

Two types of classes in the namespace are configuration classes and status classes. The configuration classes set up how the agent will work, and the status classes are used by the agent to report the actual status of the health, and performance. Each configuration class has a corresponding status class to go with it.

Figure 4A:
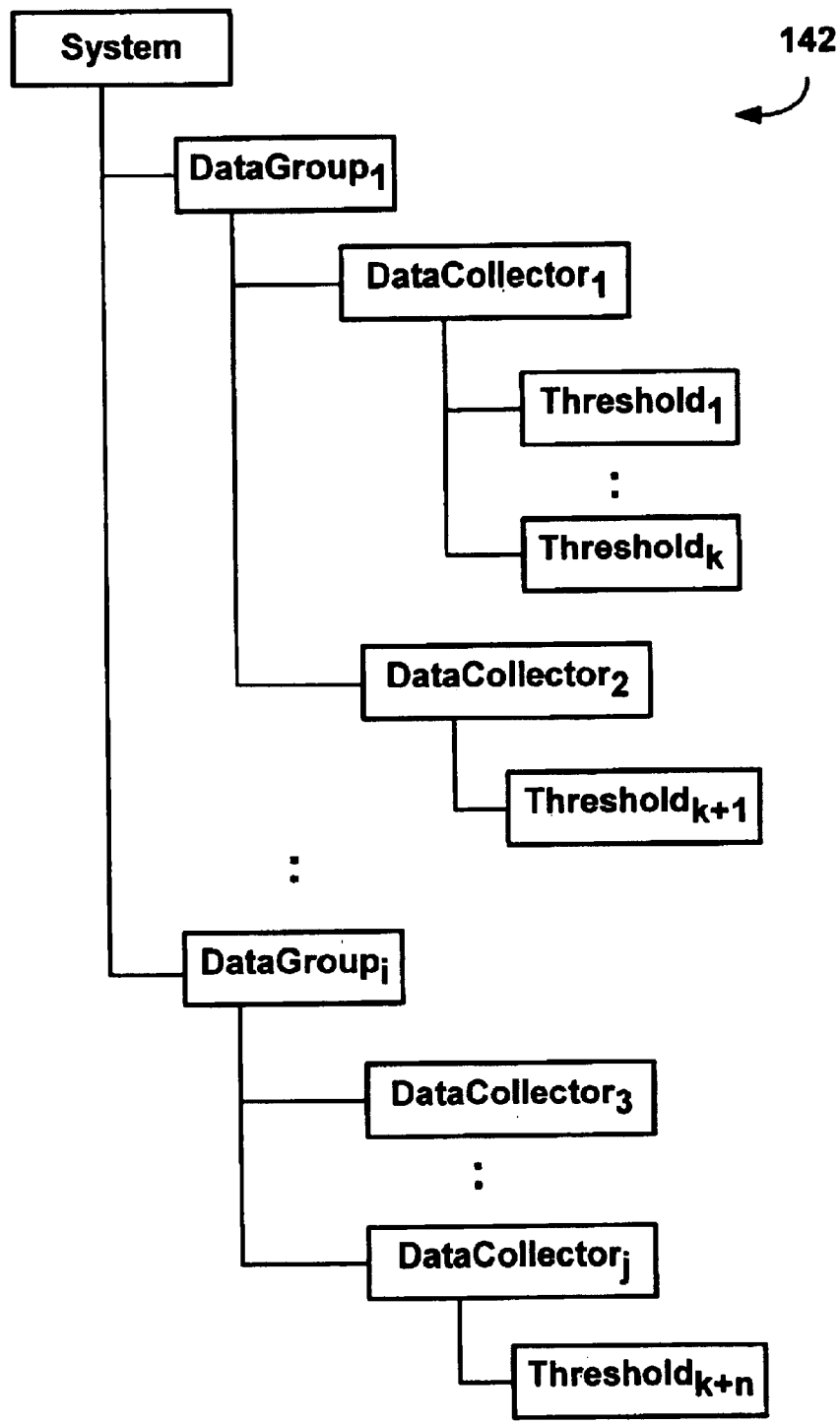
FIG. 4A is a representation of a general hierarchal namespace for a health monitoring schema in accordance with the present invention.
Figure 4B:
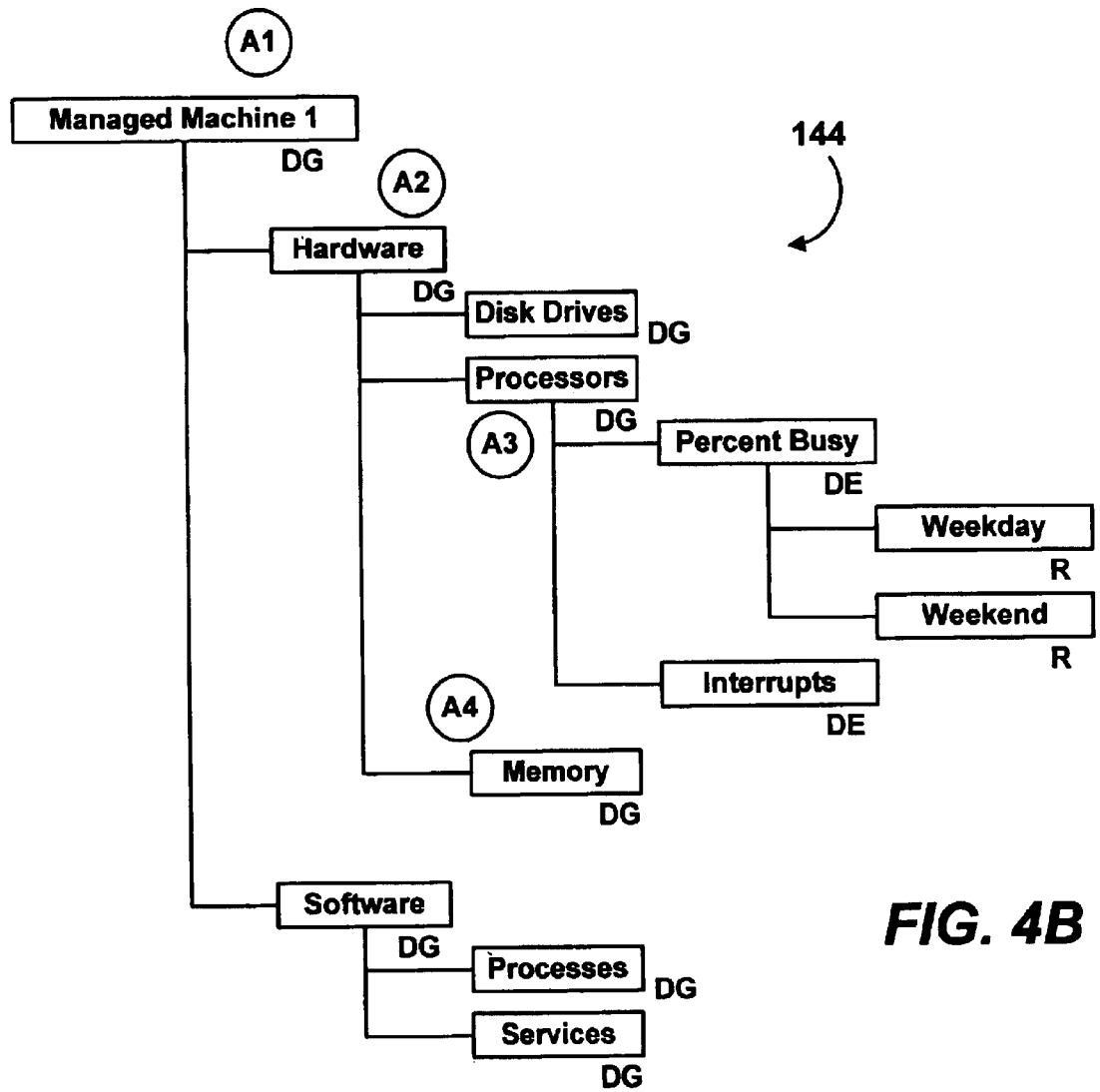
FIG. 4B is a representation of a namespace for an exemplary machine in accordance with the present invention.

FIGS. 4A and 4B represent how a namespace is hierarchically organized in accordance with the present invention, wherein FIG. 4A represents a namespace 142 in general, while FIG. 4B represents a namespace 144 (or some portion thereof) having exemplary information for a managed machine therein. Based on the namespace, when the agent starts up, it reads in from the configuration instances the information it needs to perform the health monitoring, i.e., the agent reads in instances of the classes HMSystemConfiguration, HMDataGroupConfiguration, HMDataCollectorConfiguration, HMThresholdConfiguration, and some association classes, as described below.

The agent 82 is also registered as a temporary consumer to receive events for instance modification, deletion and creation of the Configuration classes, so it can alter its behavior. Those events happen when the console, or some other third party tool, alters the work of the agent 82.

In the hierarchy shown in FIG. 4A, a system class (e.g., representing a managed machine) has one or more DataGroup classes thereunder, (such as a DataGroup for hardware and one for software, as shown in FIG. 4B). Each of the DataGroup classes may have further DataGroup classes thereunder. Further, each Datagroup may have one or more DataCollectors associated therewith, and each DataCollector may have one or more Thresholds associated therewith. Lastly, Actions (A1–A4 in FIG. 4B) may be placed anywhere in the hierarchy so as to perform some task upon detection of a violation of a Threshold, as described below.

For health monitoring operation, two important classes with instances in the health monitoring namespace are the HMDataCollectorConfiguration (DataCollector) and HMThresholdConfiguration (Threshold) classes. As described below, these classes tell the agent 82 what data to collect from WMI 88, and what the Threshold is (or Thresholds are) for a given DataCollector, respectively.

For example, the namespace 144 of FIG. 4B may represent (at least part of) a hierarchical schema on a given machine, such as the schema 94. In the example of FIG. 4B, a first class of objects defines DataGroups (designated by the letters "DG" in FIG. 4B), which represent groups of data that can be nested to represent machine resources. At the highest level of the DataGroup hierarchy are object classes representing the managed machines 64, 66 and 68, although for simplicity herein, only the managed machine 64 (Managed Machine 1) is shown in FIG. 4B. Hierarchically below the Managed Machine 1 node are "Software" and "Hardware" DataGroup nodes. The Software node in turn has two child nodes named "Processes" and "Services" represented in the namespace 144 of FIG. 4B. The Hardware node, which represents machine hardware, includes other data groups, hierarchically below the Hardware data group, representing one or more disk drives ("Disk Drives" node), processors ("Processors" node), and memory ("Memory" node).

As described above, a second set of object classes (and instances thereof) defined in the schema 94 comprise DataCollector objects. DataCollectors (designated by the letters "DE" in FIG. 4B) are objects that, when instantiated, collect data from a DataGroup resource, e.g. from a provider 100 via the WMI/CIMOM 88, by polling or event notification. In the illustrated example of FIG. 4B, the "Processors" DataGroup has two DataCollectors defined hierarchically thereunder, "Percent Busy", and "Interrupts." When instantiated, the Percent Busy DataCollector tracks the percent of time that the processor is busy (combining the values for multiple processors in a multiprocessor system). An Interrupts DataCollector tracks the number of device interrupts per second. Other DataCollectors may be provided for the Processors DataGroup, and varied DataCollectors may be provided for other DataGroups.

DataCollector objects preferably include property information about how and when to collect information from the respective data group. For example, DataCollector properties can include information such as a collection interval, i.e., how often to look for data; scheduling, e.g., the days and hours that the DataCollector is active; a path to the data, i.e., where to obtain the data, and how to obtain the data, e.g., via polling or event based notification.

A third class of objects defined in the schema is Threshold class objects (designated by the letters "R" in FIG. 4B). Threshold class objects are associated with DataCollector objects, and each provides a Threshold or Thresholds against which the DataCollector's collected data is evaluated. For example, in FIG. 4B, two Threshold objects, "Weekday" and "Weekend", are shown as being associated with the Processor's DataCollector, one of which is set up to monitor a machine in accordance with some weekday policy, and the other to monitor the machine in accordance with some weekend policy, although as can be readily appreciated, this information may be provided in a single object. Properties in a Threshold specify information such as a threshold value to compare with the collected data, how to use the collected data, e.g., its current value, average value, or a difference between collections, and the test to apply against the data, such as greater than, less than, equal, not equal, contains or does not contain. Other threshold properties include various event properties, e.g., critical or warning events that will be sent when certain threshold values are violated; one or more duration properties, which specifies how long a value has to remain in violation before it is considered as an actual violation; and Rearm, which is a value for resetting the DataCollector object back to the normal state. The Rearm value may also have associated duration and other properties. Other properties, such as for specifying a message that operators will see when a threshold is violated, may also be provided.

A DataCollector and its associated Threshold or Thresholds thus include properties that define collection information, such as when to collect, the path to collect, how to collect (poll or event notification), what to look at, what the threshold value is, the duration that the value must remain in its state relative to the threshold for it to be considered a violation, what event to generate, associated actions, a diagnostic command for provider, what event to register for, and ordinarily some others.

For example, as represented in the instances of the DataCollector and its Threshold objects shown in FIG. 5, the "Percent Busy" DataCollector tracks the percent of time that the processor is busy. If the system uses multiple processors, the DataCollector discovers each instance and tracks the percent of time that they are each busy. This feature permits the DataCollector to go out and find all processors, add those processors to the Processors DataGroup, collect data from processors in the Processor DataGroup, and then apply the thresholds to the processors in the DataGroup.

As the agent 82 runs, if polling is specified, the agent creates such a DataCollector instance to evaluate each Threshold thereunder at the designated DataCollector collection time. Alternatively, if the DataCollector is specified as an event-based type, then the DataCollector is evaluated as an event comes in. If multiple Thresholds are provided, the resource state is set to the worst state of any of the health monitoring Thresholds, e.g., if greater than eighty percent in FIG. 5, the state is considered critical even though the warning threshold value is also exceeded.

To summarize the Threshold in accordance with the instance defined in FIG. 5, the Processor object instance is in a Warning State when the utilization (average) exceeds 70 percent for more than 5 minutes, and in a Critical State when the utilization (average) exceeds 80 percent for more than 5 minutes. To define these States, an "average" value may be used, and the test property is set to "greater than" (>), the Duration property is 300 seconds (five minutes) for a Critical State, and 300 seconds for the Warning State. The Threshold value for the warning state is 70 percent, and for the critical state is 80 percent. The system is Rearmed (removed from) the critical State when the percentage becomes less than 70 percent, and is rearmed from the Warning State with a percentage becomes less than 60 percent. The monitoring occurs by polling, as indicated by the presence of "FALSE" in the EventBased field.

Figure 6A:
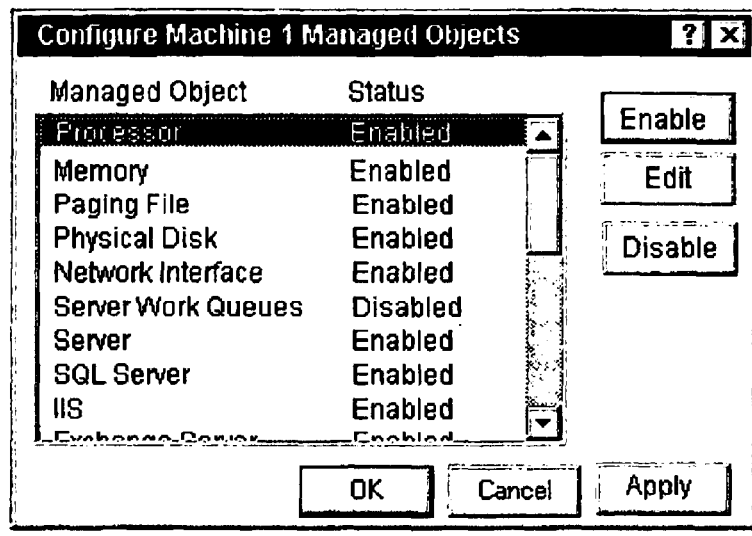
FIGS. 6A and 6B are representations of a user interfaces in the form of dialog boxes for configuring machine monitoring policies in accordance with one aspect of the present invention.
Figure 6B:
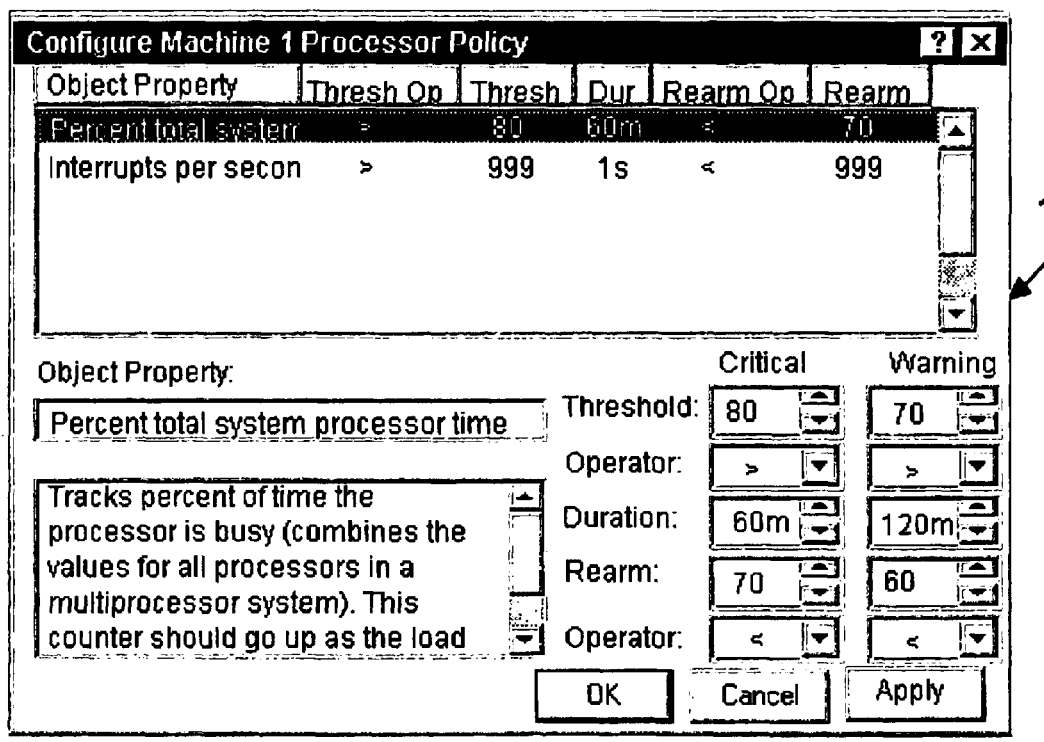

To set the values, FIG. 6A generally shows a user interface dialog 146 for selecting a DataGroup, and FIG. 6B shows a user interface dialog 148 for setting up the machine policy via a selected DataCollector and its associated Threshold or Thresholds. Such interfaces may be in the form of dialogs as shown, although as can be readily appreciated, wizards and other input mechanisms are equivalent. As shown in FIG. 6A, the user interface dialog 146 allows an administrator to select a DataGroup (previously set up in a similar manner) representing the system processor or processors, from among a set of DataGroups for a selected machine. The user interface dialog 148 enables the administrator to select a DataCollector and set the values, tests, durations and so forth for the selected DataCollector's associated Threshold or Thresholds.

The Actions, DataGroups, DataCollectors, and Threshold objects can be defined or altered within the console user interfaces 74. Changing the settings for one or more of the objects alters the schema at the particular managed machine. Altering the schema from one interface will cause monitoring to be altered at other consoles that are monitoring the machine. For example, if the schema is altered on managed machine 64 (FIG. 2) using the interface 74 of the management client 60, the changes will affect the other management client 62.

In this manner, the core agent provider 82 (FIG. 3) is able to collect data and threshold against it as specified by an administrator. The core agent provider 82 includes four ways of getting instances from WMI 88. A first is by doing a GetObject WMI API call, which polls for specific data, i.e., at the polling interval, the health monitoring agent 82 calls into WMI 88 to get an instance of an object having the data therein. The GetObject calls are asynchronous, awaiting a return from the WMI 88 to the agent. If a call is not returned before the next polling interval, another call is not sent, but instead an informational message is sent to the operator.

A second way to retrieve data is by execution of a WMI query, which returns an instance in response to the query. A polled query is similar in some ways to a GetObject call, but further permits the polling request to be restricted to a particular type of data, or to include only (or exclude only) particular resources from the data request. WMI queries are described in the aforementioned U.S. patent application Ser. No. 09/020,146.

The polling operation comprises a timer activated every so many seconds, with a minimum collection interval possible, such as not less than one second. At the polling interval, the agent loops through its DataCollector instances, (except the event bases ones), and determines which ones need data collected therefor. Those that have reached their time interval either execute their query, execute a Method, or do a GetObject. Each DataCollector that has data collected therefor has each of its associated Threshold or Thresholds evaluated to see if their thresholds were violated, or if the values indicate that the DataCollector is to be reset to the normal state. If a duration is being used on the Threshold, the Threshold needs to be evaluated at successive collection intervals to cover the duration. Further, the test may be against different values, including current property value, average property value or number of events in the window. A Threshold may also specify values against the Difference or Sum of any of those values from one interval to the next.

For Thresholds that are violated, a message is logged to the Event Log 114, and status events are created. The basic status event class that contains the message of what went wrong is in an HMThresholdStatus message. The other classes contain the rollup status as a folder would do. These are the HMDataCollectorStatus, HMDataGroupStatus and HMSystemStatus classes, described below. The only time that these status events are sent is when there is a threshold violation, or a reset, and only the classes that had a change are sent, thereby helping to minimize communication.

An HMDataCollectorStatistics event also gets sent at each collection interval regardless of changes (although at least a time property will vary each time). This event includes statistical information about properties that the HMDataCollector has been asked to track. Note that a Threshold is capable of thresholding against statistical information on properties listed therein. To this end, the console 70 acts as a temporary consumer with a query such as "select * from HMDataCollectorStatistics where GUID="X", which helps to minimize the number of events being sent. Also, if the WMI event sink pointer is NULL, events are not formatted or sent by the agent, which means no consoles are listening.

A third way in which the agent collects data is by registering a query to receive events, whereby events are received as they come in for as long as the query is desired to be active. Event based requests request data only upon the occurrence of a particular event (e.g., system hardware was removed). The operation of the event based instance collection basically works the same as other data collection, except that those instances arrive at any time. Regardless of when the values arrive, the Thresholds are still only evaluated at the Collection Interval specified, and thus the event and any event data need to be maintained until the subsequent collection interval.

If the agent cannot process the necessary workload for each of its polling intervals, it "gets behind." For example, there may be too many events being sent to the agent for it to handle, (which may be a result of a problem with the configuration of the DataCollectors and the Thresholds), whereby the agent starts falling behind. If this occurs, informational messages will be generated to alert the operator.

Events are also pushed when a console first attaches to a machine, or wants to review historical data. Since the agent regularly places data into the Event log 134 as it is running, the console 70 can ask to see a portion of it. The console 70 will execute a query that asks for a number of events, and the agent pulls them out of the Event log 134, and creates health monitoring events (as is otherwise normal) from the logged events.

The forth means of WMI interaction is through Method calls. The agent calls a WMI method, setting its In parameters. The provider looks at the In parameters, performs it work, and fills in the Out parameters, whereby the information is returned via the WMI/CIMOM 88 to the agent. Method calls are also asynchronous.

By way of example, the following table shows how the Internet Protocol interface connects to a port, issues commands and returns the return value from the command as a property when implemented as a WMI Method Provider. The "In" parameters are set with some default values to illustrate how they would be used; other protocols may be added:

---

```
ExecuteSMTP
(
    [in] String Server="smtp.email.def.com", // SMTP server
    [in] String From="uvw@xyz.com",
    [in] String To="efg@def.com",
    [in] String Data="Hello Gentleman",
    [in] uint32 Timeout=100,  // Kill request if not
                              // completed in time
    [out] uint32 ResponseTime, //Total time taken to run (ms)
    [out, values {"IPP_SUCCESS",IPP_FAILURE",
                  "IPP_TIMEOUT_EXPIRED",
                  "IPP_INVALID_HOSTNAME",
                  "IPP_RESOURCE_FAILURE",
                  "IPP_WINSOCK_ERROR"}]
    uint32 OverallResultCode
);
ExecutePing
(
    [in] String Address="www.efg.com",
    [in] uint32 Timeout=100,  // Kill request if not
                              // completed in time
    [out] uint32 ResponseTime, //Total time taken to run (ms)
    [out, values {"IPP_SUCCESS", "IPP_FAILURE",
                  "IPP_TIMEOUT_EXPIRED",
                  "IPP_INVALID_HOSTNAME",
                  "IPP_RESOURCE_FAILURE",
                  "IPP_WINSOCK_ERROR"}]
    uint32 OverallResultCode
);
ExecuteDNS
(
    [in] String Address="www.efg.com",
    [in] uint32 Timeout=100,  // Kill request if not
                              // completed in time
```

-continued

```
    [out] uint32 ResponseTime, //Total time taken to run (ms)
    [out, values {"IPP_SUCCESS", "IPP_FAILURE",
                 "IPP_TIMEOUT_EXPIRED",
                 "IPP_INVALID_HOSTNAME",
                 "IPP_RESOURCE_FAILURE",
                 "IPP_WINSOCK_ERROR"}]
    uint32 OverallResultCode
);
ExecuteFTP
(
    [in] String Server="ftp.efg.com",
    [in] String Proxy="ftp-gw",
    [in] String User="anonymous",
    [in] String Password="aXYHG@efg.com"
    [in] String Directory="bussys/winsock/winsock2",
                                        // directory
    [in] String File="index.txt",
    [in] boolean UseAscii=TRUE,
                       // ASCII if TRUE, else binary mode
    [in] uint32 Timeout=100, // Kill request if not
                             // completed in time
    [out] uint32 ResponseTime, //Total time takne to run (ms)
    [out, values {"IPP_SUCCESS", "IPP_FAILURE",
                 "IPP_TIMEOUT_EXPIRED",
                 "IPP_INVALID_HOSTNAME",
                 "IPP_RESOURCE_FAILURE",
                 "IPP_WINSOCK_ERROR"}]
    uint32 OverallResultCode
);
```

Note that the agent may also call into WMI to obtain a property representing the return value of some particular diagnostic work. To this end, the WMI goes through a diagnostic provider such as an application, whereby the application executes its diagnostic code. The value is returned asynchronously back up through the provider and to the health monitoring agent for evaluation. It is possible to have a threshold set to go off every polling interval to accomplish diagnostics, and provide notification of some nature. For example, set to poll every hour, and page with the response time or status, and/or log the time or status to a file for record keeping.

In accordance with another aspect of the present invention, dynamic multi-instance thresholding is provided, wherein a DataCollector goes out and dynamically discovers resources. This is useful, for example, when resources to be monitored are not known in advance, e.g., which processes are running. To dynamically discover the resources, an enumerator may be specified in the properties of the Data-Collector. The enumerator requests the WMI/CIMOM 88 to provide related resources (e.g., all running processes or all processors). The WMI/CIMOM 88 then finds and enumerates through the related resources (e.g., all processors), the discovered resources are added to the monitored DataGroup, and the discovered resources' data are collected by the DataCollector. The Thresholds are then applied to the collected data as described above. The enumerator thus allows monitoring of resources without prior knowledge of the resources.

The enumerator can act upon start-up of the health monitoring system 58, or can act at each polling by the DataCollectors. By enumerating at each polling, information about all running resources remains current. Therefore, a set of resources that is running at any given time can be dynamically monitored.

The agent is a consumer of the HMDataCollector instance creation, deletion and modification events, which may be created by a third party application, for example. Other possible points of integration include having applications register for notification of the same events, and using WMI interfaces to get at the same instances as does the console. For example, other applications may thus see the same events, and create some type of help desk, trouble ticketing, or event escalation process based thereon. Note that the health monitoring agent does not need its own applications programming interface (API) for interfacing therewith, as this is already built into the WMI 88, however in alternate implementations, an API can be made available. Applications can use the WMI API, ODBC, OLE DB, XML and even scripting languages like VBScript to communicate with and/or utilize the health monitoring mechanisms.

In accordance with another aspect of the present invention, actions are provided, (e.g., via Action objects), which specify what happens when a Threshold is violated, such as to send an e-mail, page someone, run a script, execute a command, or send a message alert to a console for an operator to see. To this end, as generally represented in FIG. 3, the Actions provider 114 consumes health monitoring events via the WMI/CIMOM 88, i.e., the actions provider looks for events from threshold violations, and then initiates some action (e.g., runs one or more scripts) in response to those events. Note that the Actions provider 114 thus does not provide instances or events, but rather acts as a consumer of health monitoring events.

Actions may be associated with any point in the hierarchy, and events roll up the hierarchy triggering actions. For example, an Action can be associated with the Managed Machine1 DataGroup (displayed as "A1" in FIG. 6B), a second Action ("A2") may be associated with the Hardware DataGroup, a third action ("A3") may be associated with the Processors DataGroup, and a fourth action ("A4") may be associated with the Memory DataGroup. Events roll up the hierarchy so as to instantiate the respective action or actions, e.g., a memory violation will cause the actions A4, A2 and A1 to be instantiated, but not the Processor action A3.

By way of example, a high-level administrator may associate a first action with the hardware DataGroup so as to receive an e-mail message on any hardware-related event that is critical. A second action may be associated with a disk DataGroup for a lower-level administrator so as to be paged whenever an event indicates that a disk is in a critical state. An event fired when the disk goes into the critical state will roll up the hierarchy and trigger both the second and first actions, to page the lower level administrator and send an e-mail to the higher-level administrator.

Note that more than one Action may be associated with the same DataGroup. Further note that actions can be triggered by a single event violation event, or can be triggered based on a result of logical combinations of multiple violation events.

To consume the events and initiate actions, the health monitoring schema includes an HMActionConfiguration class that has instances of it created by the console, e.g., the console 70. Associations are made from Thresholds (and possibly anything derived from HMConfiguration) to those actions. For example, there may be a Threshold to check for low disk space. To have an e-mail sent to someone when the Threshold is violated, the console 70 creates an instance of the HMEmailActionConfiguration class from the top level UI. Note that there is a separate node for actions to be created, so that they can be shared. Via the UI for the Threshold, the user can ask for a specific set of action to be tied to that Threshold, which makes an association between the ThresholdConfiguration and the ActionConfiguration. A property in the association instance tells the agent from which transition type the action is to be fired, (e.g., a transition to non-good, good, or both).

From this point, the Agent (e.g., 82) sees the association being made, and creates an appropriate configuration as necessary for the WMI standard providers to do their work. The agent creates a \_EventFilter instance with the query, such as "select * from \_instancemodificationevent where targetinstance is a Microsoft\_HMThresholdStatus WHERE GUID=ABC AND State=CRITICAL". Then, the agent creates an instance of the WMI provided class EmailEventConsumer (derived from \_EventConsumer). Lastly, an instance of \_FilterToConsumerBinding is created, which takes the event, bundles the action instance and sends it to the WMI provider to perform the actual sending of the e-mail.

Actions may be throttled so that they do not initiate their activity too often. For example, a "disk full" action may be throttled by setting a value in the associated action, whereby no matter how many times a disk full event is fired, the action only pages someone once an hour. To this end, the Agent sees to it that no events are sent to the Action Event consumer until the throttling time has elapsed. The same technique is used for the scheduling of actions, when a Threshold goes into a non-scheduled time.

There is parameter passing to actions, which allows for different results depending on what is passed in, e.g., a script may perform differently according to the parameter values. For example, a script may delete one set of files if the C: drive is full, however if the D: drive is full, the script may move another set of files. In the case of paging and e-mail, the text of the problem may be passed as a parameter. The parameters are passed to standard subscribers via the properties of the event instance, which are the same properties that can be used as special replacement tokens in a message string for a Threshod message.

Note that actions are carried out on the server machine, leading to potential permission and security problems when scripts are run, as scripts may need to be run under a specific account. In a preferred implementation, the health monitoring of the present invention relies on what WMI provides with respect to command line and script execution. A \_ConsumerFailureEvent class tracks the failure of actions, and reports them. A health monitoring HMActionStatus class can be used to view this information, along with information such as how many times an action has occurred.

In addition to configuring the agent configuration classes, the console's Snap-In user interface (e.g., 74) enables machines to be monitored, e.g., on a machine by machine basis. A view (e.g., a splitter window which acts as an ActiveX control container) is provided on the Health Monitor console user interface 74 to display configuration and status information on monitored systems to a user. Users may group systems logically within the console.

Figure 7:
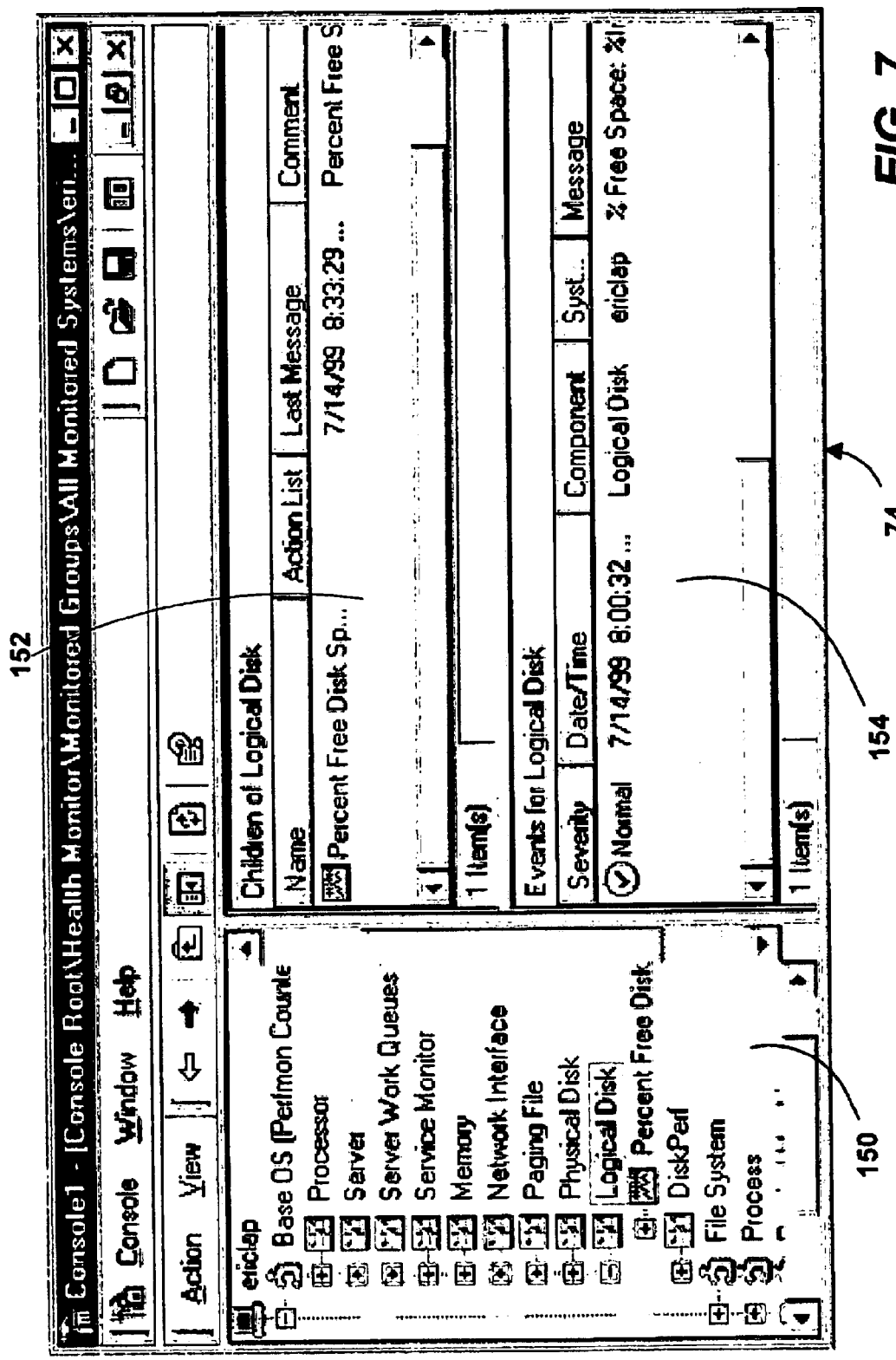
FIG. 7 is a representation of a user interface for monitoring machine health in accordance with one aspect of the present invention.

As shown in FIG. 7, each system displays a collection of monitoring objects beneath it in a scope pane 150 of the user interface 74. The scope pane 150, which is in the left part of the display window, displays a tree-formatted listing of visible nodes. This displayed tree of nodes corresponds to the namespace, and the nodes can be expanded and contracted in a known manner. When the console is started, status and configuration information is gathered from each system to dynamically populate the information displayed to a console operator.

A results pane of the user interface displays the result of selecting a node in the namespace. Depending on the nature of the selected node, the result pane may show, for example, a listing of the contents (children) of the node 152, event information 154, a management-related view such as a performance graph, or other types of information.

After startup, changes in status information or configuration information are tracked using a set of temporary WMI event consumers. Each change in the state of a given WMI monitoring instance is driven by a change in state on a monitoring Threshold. Each change in state any monitoring Threshold on a given system is logged in the console as an event displayed in the lower pane 154 of the splitter results view. Events are rolled up the hierarchy so that users may easily navigate to view events pertaining to the exact problem occurring on a remote system.

The console may further include historical and real-time graphing support for visualization of monitoring statistics. When monitoring a system with the Health Monitor agent is installed, the console operator is able to track statistics, such as current, minimum, maximum and average value, for any set of WMI properties on any instance of any WMI class. These statistics are then displayable to the user in a chart, e.g., appearing in the lower pane of the splitter window results view. Statistics are sent to a temporary consumer within the console in the form of WMI events. In one embodiment, the console only tracks statistic events for a single DataCollector and only when that DataCollector is selected in the scope pane. The console also maintains a list of historical statistic events for rendering a time dependent chart of current values of WMI properties.

As described above, users may edit configuration through a set of property pages, which may be displayed by right clicking on the scope pane nodes. Using the console, the user may select any information exposed in WMI, and create a DataCollector to represent the information. The user may further create a set of one or more Thresholds on that DataCollector. These Thresholds will then drive state changes displayed in the console. Action configurations will also be created, edited and deleted using the console. Lastly, DataCollectors may be logically grouped within the console using a Data Group object.

Figure 8A:
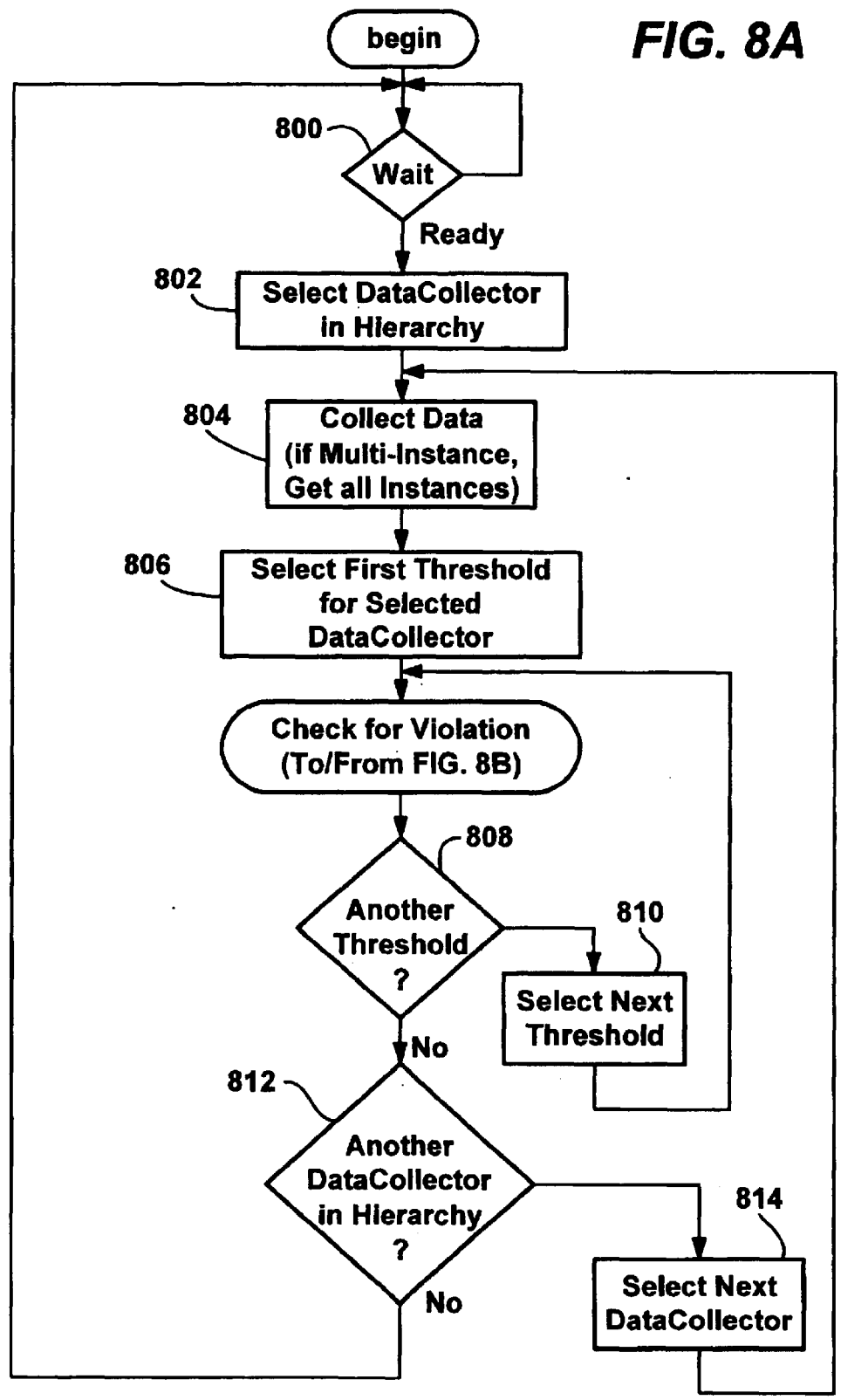
FIGS. 8A–8B comprise a diagram representing class derivations in accordance with one aspect of the present invention.
Figure 8B:
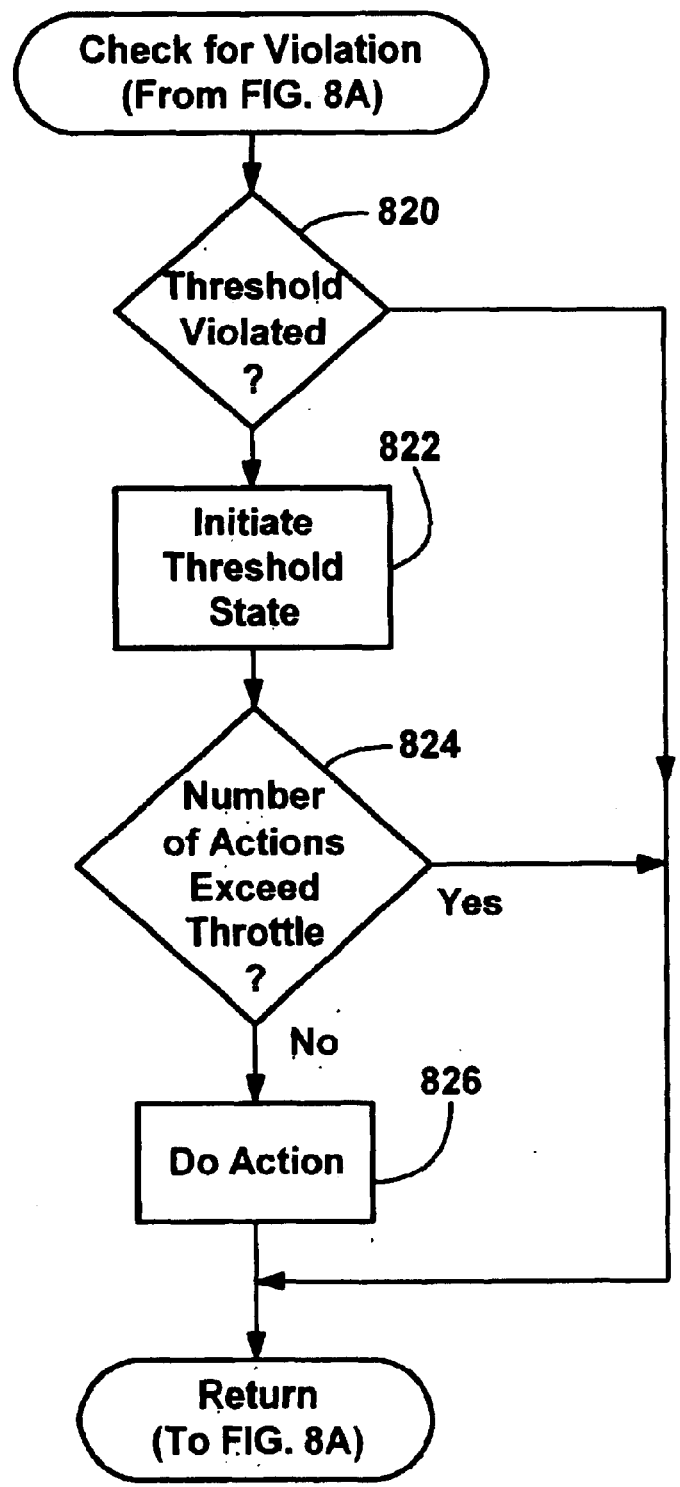

Turning now to an explanation of the operation of the health monitoring of the present invention with particular reference to FIGS. 8A–8B, there is shown a general process for monitoring the health of a system resource in accordance with one aspect of the present invention. The process begins as generally represented at step 800, i.e., waiting by the agent for a DataCollector in accordance with the various DataCollectors' schedules, collection intervals and/or the occurrence of a required event before requesting data from the WMI/CIMOM 88. Step 802 represents the selecting of a DataCollector in the hierarchy when it is ready to collect data, e.g., as scheduled or following an event.

Step 804 represents the collecting of data by the selected DataCollector. Note that some of the DataCollectors in a given system may be multi-instance DataCollectors, in which case the various instances are collected at step 804. After the data is collected, the threshold (or, if multiple thresholds for evaluation are associated with the DataCollector, a first of those thresholds) associated with the current DataCollector is selected at step 806.

Step 820 of FIG. 8B represents the evaluation of the collected data against the selected threshold. If at step 820, the threshold is not violated, the process returns to steps 808–810 of FIG. 8A to perform the evaluation for any other thresholds. If instead the threshold is violated at step 820, the threshold state identified for that threshold is initiated at step 822. The throttling is then checked via step 824 to determine if the action should be performed now, in which event step 826 is executed to perform the action, or deferred via the throttling parameter, in which event step 826 is essentially bypassed at this time. The process then returns to steps 808–810 of FIG. 8A to perform the evaluation for any other thresholds.

When all associated thresholds have been evaluated via steps 808–810 and 820–826 as described above, step 808 branches to step 812, which tests whether another DataCollector in the hierarchy is ready. If so, that next DataCollector is selected at step 814, and the process returns to step 804 to collect the data according to that DataCollector as described above. If no DataCollector is ready at step 812, the process returns to step 800 to await the next collection time/event triggering of a DataCollector.

Configuration and Status Classes

Figure 9:
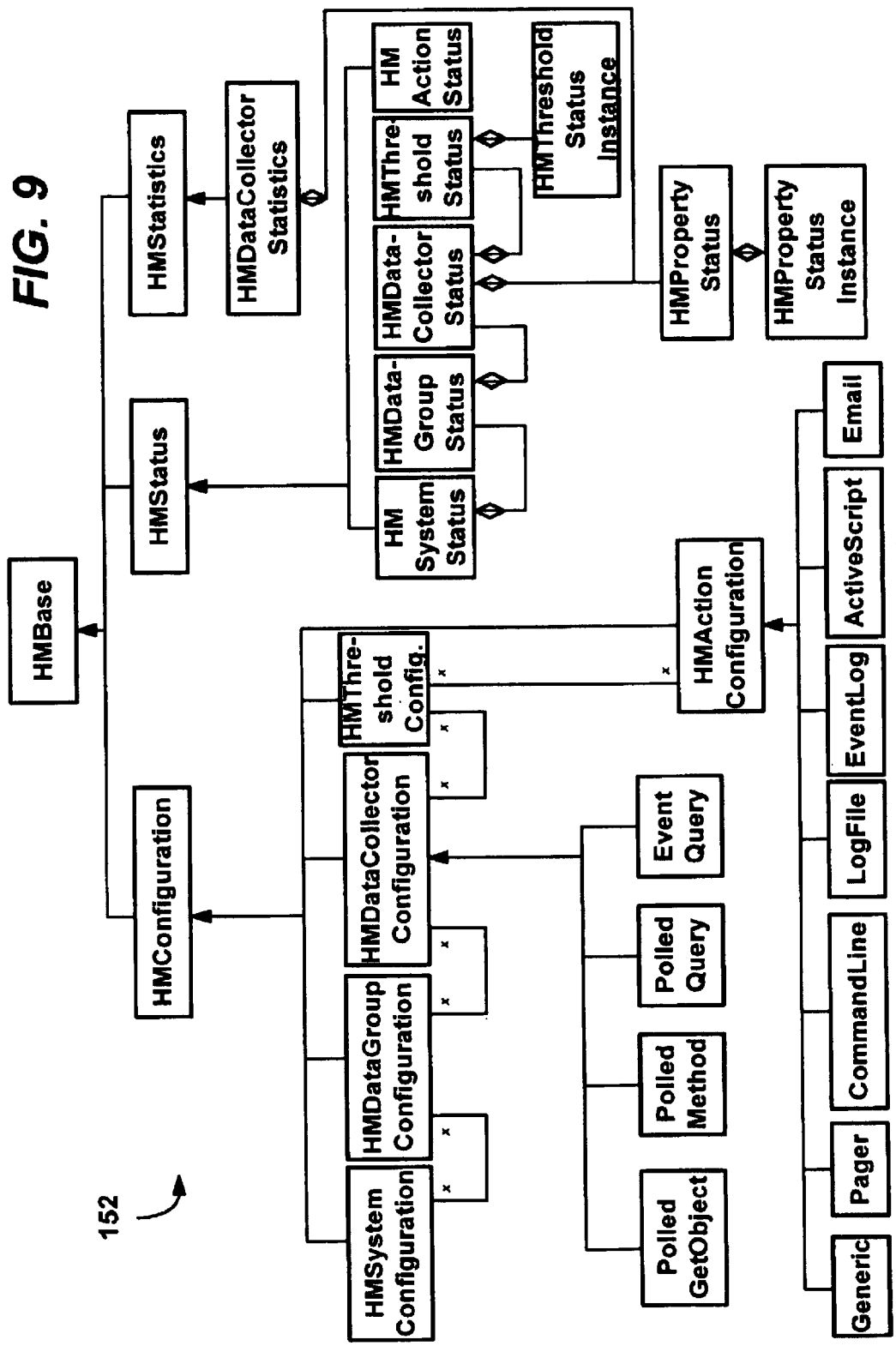
FIG. 9 is a flow diagram generally representing steps for monitoring the health of a computer system in accordance with one aspect of the present invention.

FIG. 9 generally shows which classes are derived from which. There is a hierarchy 152 that supports the configuration of which classes reference which others, and work together. There are association classes for carrying out the hierarchy as generally represented in FIG. 9.

The configuration classes may be statically stored in association with the WMI 88, and as described above, tell the consuming agent what data to collect, and what Thresholds to run. The agent sees creation, deletion and modification events performed by the health monitoring console, and the agent alters its operation accordingly. Note that third party applications may extend health monitoring by creating these instances through MOF file compilation, or through the WMI API, as does the health monitoring console.

Configuration type classes include HMSystemConfiguration, which Controls the overall enabling of the agent; HMDataGroupConfiguration, the grouping of DataCollectors (can be nested); and HMDataCollectorConfiguration, the collector of WMI instance data. Four types of DataCollectors derived from the base class, representing the different ways of collecting data from WMI, are PolledQuery, PolledGetObject, PolledMethod and EventQuery.

HMThresholdConfiguration provides the threshold for what was collected by the DataCollector, and HMActionConfiguration represents separate instances that reside on a machine describing actions (like email, or scripts) that can run. More than one Threshold can be associated with the same ActionConfiguration.

For each configuration class there is a corresponding status class. The agent is an instance and event provider for the status classes. For example, there is a configuration class representing the system. In the HMSystem class the system is configured, e.g., to enable the agent to run or not run. The corresponding status class is called HMSystemStatus. The agent provides event modification instances when the state of the machine changes. Note that the health monitoring console does not write these instances, but rather acts as a consumer of them.

Status types include HMSystemStatus, for the overall rollup of the health of the machine; HMDataGroupStatus, for the rollup of status for a group of DataCollectors and their Thresholds; HMDataCollectorStatus, for the rollup of status for HMThresholds; and HMThresholdStatus, for delivering events delivered when a Threshold is violated.

Also provided are HMDataCollectorStatistics to describe the performance status of the instance that is being collected; and HMActionStatus, which tells the state of how many scripts have been run, and how many failed.

The following lists the classes that the health monitoring provider utilizes in its own namespace. The hierarchy is generally described, along with how each class relates to each other and an explanation for each of its properties.

The following classes are used as base classes for other to derive from:

The HMBase class is the parent of the other classes, i.e., the other classes eventually derive from this class. The HMBase class has the following properties:

GUID (string) [key]

Unique identifier for this element.

HMConfiguration (derives from HMBase) is the parent of the Configuration classes. It has the following properties:

Enabled (boolean) (default value=TRUE)

Specifies the enabled state of the element.

HMStatus (derives from HMBase) is the parent of the Status classes, and has the following properties:

State (uint32) (possible values=CRITICAL, WARNING, INFO, RESET, GOOD)

Specifies the state of the element.

NumberWarning (uint32)

The number of Thresholds in the WARNING state in the hierarchy of the element.

NumberCriticals (uint32)

The number of Thresholds in the CRITICAL state in the hierarchy of the element.

NumberNormals (uint32)

The number of Thresholds in the NORMAL state in the hierarchy of the element.

HMStatistics (derives from HMBase) is the parent of the Statistics classes. It has no properties in the present implementation.

HMAssociation (derives from HMBase) is the parent of the Association classes. It has no properties in the present implementation.

Configuration Classes

The following classes are used to configure the operation of the agent on a monitored machine.

HMSystemConfiguration (derives from HMConfiguration) represents the single system. It is a singleton class, and can thus have only one instance, which is supplied at install time. This class provides the entry point for methods that can be called for configuration objects. It has the following properties:

StartupDelayTime (uint32) (default value=0)

Number of seconds after the machine boots that it will actually start its real work (DataCollectors, and Threshold evaluation). Needed because when a machine boots, WMI may startup, but other services may need time to initialize and settle down.

ResetState([in]GUID targetDataCollector) (Method)

Call this method to set the DataCollector and Thresholds back into the Normal state.

ResetStatistics([in]GUID targetDataCollector) (Method)

Call this method to set the DataCollector statistics collection back to zero, so that the Average, Min and Max values are reset.

EvaluateNow([in]GUID targetDataCollector) (Method)

Manually forces the DataCollector to evaluate the Thresholds and recalculate the state.

Delete([in]GUID targetobject) (Method)

Delete an object (and its children) form the configuration hierarchy.

Add([in]GUID targetParent) (Method)

Delete an object (and its children) form the configuration hierarchy.

Move([in]GUID targetobject, [in]GUID targetParent) (Method)

Move an object (DataGroup, DataCollector, Threshold, or Action) and its children from one location in the hierarchy to another.

Duplicate([in]GUID targetobject, [in]GUID targetparent) (Method)

Copy an object (and its children) from one location in the hierarchy to another.

Enable([in]GUID targetobject, [in]BOOL Enable) (Method)

Enable, or disable an object (and its children).

Signature([in]GUID targetobject, [in]BOOL Enable) (Method)

Enable, or disable an object (and its children).

Read([in]GUID targetobject, [out]String Enable) (Method)

Export out the text MOF description of the object and its children, including associations.

The HMDataGroupConfiguration Class (derives from HMConfiguration) is used to group HMDataCollectors together. It can be nested, in that it may contain other DataGroups. It has the following property:

Description (string) (default value="Default description")

Display text that gives a description of this group.

The HMDataCollectorConfiguration Class derives from HMConfiguration, and each instance of this class specifies a specific instance to be collected from WMI. This class acts as an abstract base class, as there are sub-classes derived therefrom. Its properties include:

Name (string) (default value="Default Name")

Display name for the DataCollector.

Description (string) (default value="Default description")

Display text that gives a description of this DataCollector.

UserName (string) (default value=NULL)

Used for proper NTLM user authentication to access another machine. Can be set to NULL for the local machine.

Password (string) (default value=NULL)

Used for proper NTLM user authentication to access another machine. Can be set to NULL for the local machine. Will be encrypted.

TargetNamespace (string)

What namespace the instance will come from. Can contain a path to a remote machine.

Context (HMContext)

The context to be passed to the provider. This is provider specific.

CollectionIntervalMultiple (uint32) (default value=1)

How often to collect the WMI instance. The base collection interval is 10 seconds, so if this is set to 3, then the collection will happen every 30 seconds. The Thresholds associated with this HMDataCollector also get evaluated at this time. Statistics get calculated and sent at this time.

StatisticsWindowSize (uint32) (default value=6)

A number that represents the number of collection intervals to calculate the statistics (like average) across. For example, if set to 6, then the window size is 60 seconds.

ActiveDays (uint8) (default value=00111110B)

Days of the week the DataCollector is active. One bit per day. For example 00000000=No days, 00000001=Sunday only, 00111110=Monday through Friday.

BeginHourTime (uint32) (default value=6)

Begin hour of the day when this DataCollector is active. (24 hour clock. E.g. 0905).

BeginMinuteTime (uint32) (default value=0)

Begin minute of the day when this DataCollector is active.

EndHourTime (uint32) (default value=23)

End hour of the day when this DataCollector is no longer active. (24 hour clock. E.g. 1350).

EndMinuteTime (uint32) (default value=0)

End minute of the day when this DataCollector is no longer active.

TypeGUID (string)

To aid in any UI that has a custom way of displaying different types of DataCollectors differently to the user.

RequireReset (boolean) (default value=FALSE)

Specifies that the DataCollector once in the non-normal state will not automatically transition back into the normal state. To get to the normal state the Reseto method could be called, or a Threshold could be created that would generate a reset.

StatisticsPropertyNames[ ] (string)

Array of the names of the properties to keep statistics on. These will show up in the corresponding HMDataCollectorStatistics instance.

The HMPolledGetObjectDataCollectorConfiguration Class (derives from HMDataCollectorConfiguration) is for an instance that will do a GetObject at each interval.

ObjectPath (string)

Specifies what to get. e.g. "Win32_SystemDriver.Name="DiskPerf"".

The HMPolledMethodDataCollectorConfiguration Class (derives from HMDataCollectorConfiguration) is for an instance that will execute a method at each interval.

ObjectPath (string)

Specifies the class name

MethodName (string)

What method to execute.

Arguments[ ] (HMContext)

Arguments to the method.

The HMPolledQueryDataCollectorConfiguration Class (derives from HMDataCollectorConfiguration) is an instance that will run a query at each interval.

Query (string)

Specifies a query. E.g. "select * from Win32_Process where name=outlook".

The HMEventQueryDataCollectorConfiguration Class (derives from HMDataCollectorConfiguration) is an instance that will act as a temporary consumer for a registered query.

Query (string)

Specifies a query, e.g., "select * from FanEvent".

The HMThresholdConfiguration Class (derives from HMConfiguration is used to threshold against the data instance that the HMDataCollector instance is collecting. There can be more than one HMThreshold looking at a given property of the HMDataCollector instance. The Threshold is evaluated each time the HMDataCollector representation in the agent gets a data instance.

Name (string) (default value="Default name")

Display name for the DataCollector.

Description (string) (default value="Default description")

Display text that gives a description of this DataCollector.

ID (uint32) (default value=0)

User definable, and viewable id that shows up in any event. Useful for later query filtering for specific events.

PropertyName (string)

What property to look at from the associated HMDataCollector instance. The Threshold is then setup to look at the value of this property at each collection interval of the HMDataCollector, and decide if it has been violated.

UseAverage (boolean) (default value=FALSE)

Do Threshold against the average value, not the current value. The average value is calculated from all the values that are collected during the specified collection window of the DataCollector. As specified with the StatisticsWindowSize property of the DataCollector, UseDifference (boolean) (default value=FALSE)

Do Threshold against the change, not the current value. e.g., Difference in CURRENT_VALUE from one DataCollector collection to the next. Does not apply to strings. Uses an absolute value, so that if the number decreases it is possible to check for this also.

ThresholdCondition (uint32) (default value=0)

The condition to use for the Threshold. Set this property to one of the following: "<", ">", "=", "!=", ">=", "contains", "<=", "!contains".

ThresholdValue (string)

Value to use for the Threshold. Can represent a string, integer, or datetime. It will be converted to whatever the datatype is of the property the Threshold is against.

ThresholdDuration (uint32) (default value=0)

How long the value must remain in order to have violated the Threshold, e.g., CPU utilization must be sustained at an average value of greater than 80% for five minutes before the Threshold is violated. Set this property to zero to be instantaneous.

State (uint32) (default value=0)

The state that we transition to if the Threshold is violated. Set it to one of the following values: "CRITICAL", "WARNING", "INFO", "RESET".

RequireManualReset (boolean)

Time of original creation. If set to TRUE, the ResetValue property is not used. For example, Thresholds against NT Event Log events cannot be reset against.

CreationDate (datetime)

Time of original creation.

LastUpdate (datetime)

Time of last modification.

Message (string) (default value="Default message")

What message gets sent in the event created when the Threshold is violated. Can contain special embedded tags such as %CURRENTVALUE%, %DATETIME%. %CONDITION%, %DURRATION% and %INSTANCENAME%. The console app replaces these with other data that is available in the HMThresholdStatus instance.

%CurrentValue%=The current value that caused the Threshold violation

%DateTime%=The time the violation occured.

%ThresholdCondition%=The test condition like "less than"

%ThresholdDuration%=The durration as stated in the Threshold

%SystemName%=Name of the system the agent is running on. (Not the remote machine is the DE that the Threshold is against is remote)

%ThresholdName%=The name that was given to the ThresholdConfiguration

%InstanceName%=The name of the instance for which this violation happened.

Example="Drive %InstanceName% is full at %DateTime%"

StartupDelay (uint32) (default value=0)

Delay time from machine re-boot to start evaluating a Threshold.

ActiveDays (uint8) (default value=00111110B)

Days of the week the DataCollector is active. One bit per day. For example 00000000=No days, 00000001= Sunday only, 00111110=Monday through Friday.

BeginHourTime (uint32) (default value=6)

Begin hour of the day when this DataCollector is active. (24 hour clock. E.g. 0905).

BeginMinuteTime (uint32) (default value=0)

Begin minute of the day when this DataCollector is active.

EndHourTime (uint32) (default value=23)

End hour of the day when this DataCollector is no longer active. (24 hour clock. E.g. 1350).

EndMinuteTime (uint32) (default value=0)

End minute of the day when this DataCollector is no longer active.

The HMActionConfiguration Class (derives from HMConfiguration) is a Threshold class used to specify actions to take when a Threshold changes state. Action Configurations can be associated to Thresholds, and more than one Threshold can be associated to the same Action.

Name (string) (default value="Default name")

Display name.

Description (string) (default value="Default description")

Display text that gives a description of this Action.

TrackFailure (boolean) (default value=FALSE)

States if tracking of the completion and status of an action is required. If set to TRUE, then status events will be produced indicating the status.

ThrottleTime (uint32) (default value=0)

How many seconds must elapse before this Action can be performed again. Zero means always.

ReminderTime (uint32) (default value=0)

How often to repeat the Action if the object violated stays in the violated state.

The HMActionAssociation Class (derives from HMAssociation) is used to associate any Configuration derived instance to an action. This enables actions being associated to Systems as well as Thresholds.

ParentPath (HMConfiguration)

The parent.

ChildActionPath (HMActionConfiguration)

The child action.

Transition (uint32) [values=NONGOOD,GOOD,BOTH]

The transition type that triggers the Action.

Status Classes

The following sections contains the specification for the classes that the health monitoring agent uses to report on the health status of the system. The agent acts as an instance and event provider for these. Instance modification events will be produced by the agent for each of these. The instances can also be enumerated.

The HMSystemStatus Class (derives from HMStatus) corresponds to the HMSystemConfiguration instance. There is only one on the machine. It holds the current status of the machine, and is just a rollup of all the status from the HMDataGroup instances that are under it. This event gets sent when a state change happens at the system level. The instances can be enumerated at any time.

Name (string) [key]

System display name.

ActiveTime (uint64)

Amount of time in seconds that the agent has been active..

NumberWarnings (uint32)

The number of Thresholds that are currently in the Warning state.

NumberCriticals (uint32)

The number of Thresholds that are currently in the Critical state.

NumberNormals (uint32)

The number of Thresholds that are currently in the Normal state.

State (uint32)

The state of the system, the roll up of all the HMDataGroups. It will be set to what ever the worst one is. The value will be one of the following: "CRITICAL", "WARNING", "INFO", "GOOD".

DataGroups[ ] (HMDataGroupStatus)

Array of all the children DataGroupStatus elements. If looking at this because of an event, then only the DataGroups that changed from the last event are contained. If because of an enumeration, then all DataGroups are included.

The HMDataGroupStatus Class (derives from HMStatus) contains the status rollup for all the HMDataCollectors and MDataGroups under it. This event gets sent when there is a state change at the DataGroup level. The instances can be enumerated at any time.

DataGroups[ ] (HMDataGroupStatus)

Array of all the children DataGroupStatus elements. If looking at this because of an event, then only the DataGroups that changed from the last event are contained. If because of an enumeration, then all DataGroups are included.

DataCollectors[ ] (HMDataCollectorStatus)

Array of all the children DataCollectorStatus elements. If looking at this because of an event, then only the DataCollectors that changed from the last event are contained. If because of an enumeration, then all are included.

The HMDataCollectorStatus Class (derived from HMStatus) contains the status rollup for all the HMThresholds under it. This event gets sent when there is a state change at the DataCollector level. The instances can be enumerated at any time.

Name (string)

System display name.

NumInstancesCollected (uint32)

How many events were received in the sampling window. This is only set to a valid value if the type of HMDataCollector that this is associated with is of the HMEventQueryDataCollector type.

Statistics[ ] (HMPropertyStatistics)

Statistics for each of the properties we are collecting them on.

Thresholds[ ] (HMThresholdStatus)

Array of all the children ThresholdStatus elements. If looking at this because of an event, then only the Thresholds that changed from the last event are contained. If because of an enumeration, then all are included.

The HMDataCollectorStatistics Class (derived from HMStatistics) gets sent at each collection interval with the statistics information therein. The statistics information is whatever properties were listed to be included here by the HMDataCollectorConfiguration. Statistics events will then be sent for instance modification at each collection interval.

Statistics[ ] (HMPropertyStatistics)

Statistics for each of the properties we are collecting them on.

DTime (datetime)

Time of the sample.

The HMThresholdStatus Class (derives from HMStatus) contains the state of the Threshold. Modification events get sent each time the Threshold is violated, or returns back to the GOOD state. The instances can be enumerated any time.

StatusGUID (string)

Unique identifier of the status change.

SystemName (string)

Name of the system the Agent is running on.

ThresholdName (string)

Name of the Threshold this originated from.

ID (string)

User defined in the HMThreshold. So the user can identify the events.

DTime (datetime)

The time that the Threshold was violated. Will be the same as the time that the event is created.

ResourceDLL (string)

Name of the DLL to get the strings from.

Currentvalue (uint32)

The value that caused the Threshold to be violated.

ThresholdCondition (uint32)

The condition that was used in the HMThreshold.

ThresholdDuration (uint64)

The duration that was used in the HMThreshold.

Instances[ ] (HMThresholdStatusInstance)

Usually contains only one element. In the case of multi-instance there will be more than one.

The HMThresholdStatusInstance Class (derives from HMThresholdStatus) contains the state of the Threshold. Modification events get sent each time the Threshold is violated, or returns back to the GOOD state. The instances can be enumerated any time.

Message (string) [StringRID(0)]

Comes from the HMThreshold.

InstanceNameState (string)

Name of the instance the data is for (e.g. "C:" drive).

State (uint32)

The state we are transitioning to. The value will be one of the following: "CRITICAL", "WARNING", "INFO", "GOOD". In the case of the INFO state we do not actually stay at that state. It is just sent, but we remain at what ever state we were already in.

CurrentValue (string)

Current value that is causing the Threshold violation.

The HMPropertyStatistics Class contains statistics on the values of a single property of an instance that the HMData- CollectorStatus instance represents. This acts as a base class for the actual classes to be used. Min, Max and average only pertain of the DataCollector property is numeric.

PropertyName (string)

Name of the property that the statistics are for.

Instances (HMPropertyStatusInstance)

Array containing the values for each instance.

The HMPropertyStatistics Class contains statistics on the values for a single instance.

InstanceName (string)

Name of the property that the statistics are for.

CurrentValue (string)

Current value of the property.

MinValue (string)

Minimum value of the property.

MaxValue (string)

Maximum value of the property.

AvgValue (string)

Average value of the property.

Data Collection and Thresholding Examples

FEATURE: Simple Instance Poll

SCENARIO: Check for disk space getting low. Send Critical event if it falls below five percent free. DataCollector collects WMI instance at interval, and Thresholds are evaluated at those times. This is the most common type of thresholding, and can be used to accomplish many different things, like testing for a service being stopped. Test conditions include <, >, =, !=, >=, <=, contains and AND !contains. This example covers the case where an individual instance of logical drive is specified in the Object path, later scenarios show how to make use of the multi-instance capabilities.

DATACOLLECTOR: Collect Perform provider instance HMLogicalDiskPerf.Name="C:". Ask for the property PctFreeSpace. Collect every five minutes.

THRESHOLD: Test for a current value of less than 5% on the PctFreeSpace property.

FEATURE: Instance Poll with Averaging and Duration

SCENARIO: Check for CPU usage remaining high (averaging over 90% for 5 minutes).

DATACOLLECTOR: Collect Perform provider instance HMProcPerf. Ask for the property TotProcTime. Collect every 10 seconds. Set the statistics window to 60 seconds.

THRESHOLD: Set the UseAverage property to TRUE, set duration to 5 minutes, test value for exceeding 90.

FEATURE: Value difference for thresholding.

SCENARIO: Allow a certain number (for this example 50 is chosen) of logon errors per hour to occur on a server, beyond that notification is desired. This can be used with counters that increase, but never decrease, or with normal counters, to track if some value increases, or decreases at a rate that is unexpected.

DATACOLLECTOR: Collect Perform provider instance HMServerPerf. Set the collection interval to one hour.

THRESHOLD: Test for a value going over 50. Set the UseDifference property to TRUE.

FEATURE: Statistics window sample summing for thresholding.

SCENARIO: Could be collected, or event based. Want to add all the values together over a certain time period and test for what the sum should be.

DATACOLLECTOR: Set the statistics window to 60 seconds. At each collection interval, the sum total is the sum of the previous 6 values at the collection interval.

THRESHOLD: Set the UseSum property to TRUE, test for value exceeding some amount.

FEATURE: Active test with response time.

SCENARIO: This goes beyond the normal data collection. It forces some application to be exercised. It will run some normal operation, or some special diagnostic code. One of the return properties will be the result code, another might be response time. The Internet Protocol Provider is an example of this, it can be set up to drive an IIS server, or any other application that uses Internet Protocols (SMTP, DNS, FTP . . . ).

DATACOLLECTOR: Normal setup of instance collection.

THRESHOLD: Standard thresholding against a property to test its return code or response time.

FEATURE: Proxy of a remote machine that does not have health monitoring running on it.

SCENARIO: May have a Win98 machine, or a mission critical machine that only has minimal software on it.

DATACOLLECTOR: Any type of data element can be setup to collect the instance, but to minimize network traffic, you could setup the collection to be event bases. Then notification only comes when the event needs to be sent. The TargetNamespace property has the machine remote machine name at the beginning.

THRESHOLD:

FEATURE: Proxy of a remote machine that has health monitoring running on it.

SCENARIO: Do not want the overhead of a full monitoring console with all the status data being sent, and the complete tree depth. Or have a separate application registered to receive events from the agent.

DATACOLLECTOR: The TargetNamespace property has the machine remote machine name at the beginning. Setup an event based query for the HMMachineStatus modification event.

THRESHOLD: Test for a Critical status.

FEATURE: Require Human acknowledgment of critical status events.

SCENARIO: When a DataCollector and Threshold go into the critical state want the state to stick, even if the value that set it there goes back to normal.

DATACOLLECTOR: Set the RequireManulaReset property to TRUE. The Reset Method on the DataCollector must be called to reset back to normal.

THRESHOLD:

FEATURE: Multi-instance, with each sharing the same Threshold, but notification of thresholding done individually.

SCENARIO: Have a machine with logical drives C:, D:, and E:. Want the same Threshold to apply to each individually. If any of them fall below 5%, then send a critical event.

DATACOLLECTOR: Collect Perform provider instance HMLogicalDiskPerf. Ask for the property PctFreeSpace. Collect every five minutes. In the Object path, just give the class, and do not specify it any further than that.

THRESHOLD: Test for a current value of less than 5% on the PctFreeSpace property.

FEATURE: Multi-instance objects that come and go.

SCENARIO: MSMQ connection objects. Don't know up from how many if any instances there will be. Want to be notified when instances come and go as well as have each Threshold applied to each instance for the time that they do exist. Can still specify Thresholds to threshold against properties of the instances as normal.

DATACOLLECTOR: Just give the class name for the ObjectPath. Set NotifyOfCreationDeletion to TRUE.

THRESHOLD:

FEATURE: Multi-instance thresholding across the collection.

SCENARIO: Want to know if the sum of diskspace across all logical disks drops below a certain number.

DATACOLLECTOR: Set the UseMultiInstanceSum to TRUE.

THRESHOLD: Set up to test if the value goes below the threshold.

FEATURE: Auto Reset—NT Event Log thresholding.

SCENARIO: Set up one Threshold to turn the state critical, and another to tell it to reset, and re-evaluate all Thresholds on the DataCollector. This may be necessary in the case of thresholding against NT Event Log events. When the Reset Threshold happens the other Threshold gets evaluated, and it finds it is not in a critical state anymore.

DATACOLLECTOR: Setup the event based query DataCollector with a query like "select * from __InstanceCreationEvent where TargetInstance isa \"Win32_NTLogEvent\" AND TargetInstance.LogFile=\"Application\" AND (TargetInstance.EventIdentifier=1073745935 OR TargetInstance.EventIdentifier=1073745972)"

THRESHOLD: Setup one rule to look for 1073745935 and set to the critical state, and another Threshold to look for 1073745972 and set to RESET.

FEATURE: Scheduling of Thresholds and or DataCollector collection.

SCENARIO: Monday through Friday want one Threshold in place that is more strict, and weekends want a less strict Threshold to run. Can even use this in combination with actions, so different people get paged under different conditions and times. Or different scripts get run as the condition gets worse.

DATACOLLECTOR: Can set the schedule.

THRESHOLD: Create two Thresholds, one for Monday through Friday, and one for the weekend.

FEATURE: Disabling of DataCollector collection and Threshold evaluation.

SCENARIO: Want to manually turn off specific thresholding.

DATACOLLECTOR: Set the Enable property to FALSE.

THRESHOLD: Set the Enable property to FALSE.

FEATURE: Delay time before Threshold begins being evaluated

SCENARIO: The service, or application being monitored needs several minutes after reboot to settle down and reach a valid state.

DATACOLLECTOR:

THRESHOLD: Set the startup delay to 5 minutes.

FEATURE: Message customization.

SCENARIO: Users can type in their own customized messages for Threshold status events. They can include any of the supported key words that health monitoring will replace, to have data inserted into their string. Strings can be set straight in there, or as IDs to be pulled out of a resource DLL.

DATACOLLECTOR:

THRESHOLD: Set the string in the Message property. Make use of the key words—%ThresholdCondition%, %ThresholdValue%, %ThresholdDuration%, %CurrentValue% and others.

FEATURE: Script running through DataCollector

SCENARIO: Being able to AND and OR by using a script that looks for health monitoring ThresholdStatus instances with the more complicated Boolean expression in it.

DATACOLLECTOR: Set up a script to run that looks a the states of any number of Thresholds and DataCollector, then sets the state of its own self. ANDing of states of Thresholds in a script would look like r1=Getobject(ThresholdStatus.GUID=1);

r2=GetObject(ThresholdStatus.GUID=2);

if (r1.state==CRITICAL AND r2.state==CRITICAL) Set our state to critical;

THRESHOLD: If we are critical.

FEATURE: Performance Monitoring/Graphing.

SCENARIO: Used as a replacement for the Perform UI. Use the console SnapIn to view a data elements statistics view and watch the graphs.

DATACOLLECTOR: Set up which properties you are interested in.

THRESHOLD: Do not necessarily need Thresholds off of the DataCollector, if only the statistics graphs are to be viewed.

FEATURE: Scheduled logging.

SCENARIO: Use of Agent as a timer to run some diagnostic, then have Threshold always cause an action to occur that runs a script to log data.

DATACOLLECTOR: Set up which properties are of interest.

THRESHOLD: Set up the Threshold to always be violated. May need a Reset Threshold alongside to be able to have the alternate with the violated Threshold to get it to be violated each time. Set up the action script to log to a file.

| Processor | | |
| --- | --- | --- |
| Object Property | Policy Condition | Description |
| Percent total system processor time | Critical: Threshold > 80% Duration = 60 minutes Rearm < 70% Warning: Threshold > 70% Duration = 120 minutes Rearm < 60% | Tracks percent of time that the processor (combines the values for all processors in a multiprocessor system) is busy. This attribute should go up as the load on the system increases and performance decreases, unless some other factor besides the processor is causing the bottleneck. Utilization of over 80% for excessive periods of time may be an indication of a processor bound system |
| Interrupts per second | Critical: Threshold > 999 Duration = 1 second Rearm = 999 Warning: Threshold > 700 Duration = 1 second Rearm = 700 | Number of device interrupts per second. When this counter hits 1000 or over, you should check the efficiency o hardware I/O devices (e.g. disk controllers, network cards, any other system devices). |

| | Memory | |
|---|---|---|
| Object Property | Policy Condition | Description |
| Pages/ Second | Critical:<br>Threshold > 60<br>Duration = 5 minutes<br>Rearm < 20<br>Warning:<br>Threshold > 40<br>Duration = 5 minutes<br>Rearm < 30 | Tracks the number of pages swapped to disk per second by the virtual memory system. When this counter gets consistently very high, your system is most likely running out of RAM. |
| Ratio of committed bytes to commit limit | Critical:<br>Threshold > 90% the commit limit<br>Duration = 5 minutes<br>Rearm < 80% the commit limit<br>Warning:<br>Threshold > 75% the commit limit<br>Duration = 5 minutes<br>Rearm < 65% the commit limit | The commit limit is roughly the size of physical memory plus the paging file. Committed bytes represent the total of virtual memory committed at any point in time. When committed bytes approaches the commit limit, the the system is running out of virtual memory and paging file must be extended. |
| Pool non-paged bytes | Critical:<br>Threshold > physical memory<br>Duration = 5 minutes<br>Rearm < physical memory<br>Warning:<br>Threshold > 90% of physical memory<br>Duration = 5 minutes<br>Rearm < 80% of physical memory | Measures the amount of non-paged memory in the system. When this value is greater than the physical memory of the system, the system will start thrashing, swapping memory back and forth to disk at a very fast rate. The only resolution to this problem is to add more physical memory to the system. |
| Pages per second | Critical:<br>Threshold > 10<br>Duration = 5 minutes<br>Rearm < 8<br>Warning:<br>Threshold > 8<br>Duration = 5 minutes<br>Rearm < 6 | Measures the rate at which memory is swapped to disk. The normal rate for this value is less than 5 pages per second. If the system begins to sustain a value of 10 or greater the system is thrashing. The paging rate can be lowered by adding physical memory to the system. |
| Available memory bytes | Critical:<br>Threshold < 1 MB<br>Duration = 15 minutes<br>Rearm > 5 MB<br>Warning:<br>Threshold < 20 MB<br>Duration = 30 minutes<br>Rearm > 30 MB | Presents the amount of free physical memory. A reading that stays less than 1 MB on an NT Server indicates paging is occurring. |

| | Paging File | |
|---|---|---|
| Object Property | Policy Condition | Description |
| Percent usage | Critical:<br>Threshold > 90<br>Duration = 10 minutes<br>Rearm < 80<br>Warning:<br>Threshold > 70<br>Duration = 15 minutes<br>Rearm < 60 | Shows the current percentage of a page file in use. If this counter nears 100%, the system is running out of paging space, and the page file should be expanded. Conversely, the page file should not be allowed to expand because it will become fragmented, and performance will significantly suffer. |
| Percent peak usage | Critical:<br>Threshold > 90<br>Duration = 10 minutes<br>Rearm < 80<br>Warning:<br>Threshold > 70<br>Duration = 15 minutes<br>Rearm < 60 | Shows the peak percentage of a page file usage If this counter nears 100%, the system is running out of paging space, and the page file should be expanded. |

| | Physical Disk | |
|---|---|---|
| Object Property | Policy Condition | Description |
| Percent Disk Time | Critical:<br>Threshold > 90<br>Duration = 15 minutes<br>Rearm < 80<br>Warning:<br>Threshold > 70<br>Duration = 20 minutes<br>Rearm < 60 | Shows how busy the disk drive is. A separate instance should be monitored for each disk in the system. When this counter gets very high, it is an indicator that something such as paging or other high-disk usage is occurring. Readings near 100% can indicate a physical disk bottleneck |
| Disk queue length | Critical:<br>Threshold > 2<br>Duration = 0<br>Rearm < 2<br>Warning:<br>Threshold > 1<br>Duration = 0<br>Rearm < 1 | Number of pending disk I/O requests. A number greater than 2 will indicate that requests for disk services are backing up. |

| | Network Interface | |
|---|---|---|
| Object Property | Policy Condition | Description |
| Percentage interface utilization | Critical:<br>Threshold > 40<br>Duration = 15 minutes<br>Rearm < 25<br>Warning:<br>Threshold > 30<br>Duration = 30 minutes<br>Rearm < 30 | Total bytes per second track the number of bytes per second sent and received over the network interface. When calculated against the interface's current bandwidth (in bits per second), this value can indicate when network traffic has become excessively |

Network Interface

| Object Property | Policy Condition | Description |
|---|---|---|
| | | high (e.g. greater than 40% for an extended period of time, say 5–15 minutes). |

Server Work Queues

| Object Property | Policy Condition | Description |
|---|---|---|
| Work item shortages | Critical:<br>Threshold > 15<br>Duration = 30 minutes<br>Rearm < 10<br>Warning:<br><br>Threshold > 0<br>Duration = 60 minutes<br>Rearm < 0 | Represents how many shortages of work item storage space are occurring. An increasing value over 30 minutes may indicate that the server is overloaded (i.e. bottleneck at the server service) and does not have enough SMB storage space. In any event, sustained values greater than zero indicate the need to increase the 'MaxWorkItems' registry value for the Server service. |
| Context block queue time | Critical:<br>Threshold > 50<br>Duration = 5 minutes<br>Rearm < 40<br>Warning:<br><br>Threshold > 25<br>Duration = 15 minutes<br>Rearm < 10 | How long a server request must wait in the server before it is processed. This counter is one of the best parameters to use to detect a busy server. Watch for this value to increase as client load increases. If it averages greater than 50 (msec), it indicates the server service is the bottleneck. |
| Processor queue length | Critical:<br>Threshold > 5<br>Duration = 5 minutes<br>Rearm < 3<br>Warning:<br><br>Threshold > 3<br>Duration = 10 minutes<br>Rearm < 2 | Measures the backlog for your processor. This counter gives you a clue when a process is hogging the processor. The queue length is the current length of the server work queue for this CPU. A sustained queue length greater than four may indicate processor congestion. This is an instantaneous count, not an average over time. |

Security Monitoring Objects
Server

| Object Property | Policy Condition | Description |
|---|---|---|
| Errors logon | Critical:<br>Threshold > 5<br>Duration = 5 minutes<br>Rearm < 2<br>Warning:<br><br>Threshold > 3<br>Duration = 5 minutes<br>Rearm < 1 | Number of times that a password violation occurred (i.e. failed logon attempts to the server). Can indicate whether password guessing programs are being used to crack the security on the server. |
| Errors access permissions | Critical:<br>Threshold > 5<br>Duration = 5 minutes<br>Rearm < 2<br>Warning:<br><br>Threshold > 3<br>Duration = 5 minutes<br>Rearm < 1 | Number of times that a violation of some type of permission occurred. Can indicate whether somebody is randomly attempting to access files in hopes of getting at something that was not properly protected. |

Fault Monitoring Objects
Server

| Object Property | Policy Condition | Description |
|---|---|---|
| Sessions errored-out | Critical:<br>Threshold > 5<br>Duration = 0<br>Rearm < 2<br>Warning:<br><br>Threshold > 2<br>Duration = 0<br>Rearm < 1 | Number of sessions that were disconnected because of an error. Indicates how frequently network problems are causing dropped sessions on the server. |
| Pool paged failures | Critical:<br>Threshold > 5<br>Duration = 0<br>Rearm < 1<br>Warning:<br><br>Threshold > 0<br>Duration = 0<br>Rearm < 0 | How often NT ran out of page memory. Any value greater than 0 normally indicates a shortage of physical memory. |
| Pool nonpaged failures | Critical:<br>Threshold > 5<br>Duration = 0<br>Rearm < 1<br>Warning:<br><br>Threshold > 0<br>Duration = 0<br>Rearm < 0 | How often NT ran out of nonpaged memory. Any value greater than 0 normally indicates a shortage of physical memory. |

Network Interface

| Object Property | Policy Condition | Description |
|---|---|---|
| Heartbeat failure | Critical:<br>Threshold > 3 retries<br>Duration (i.e. timeout) = 2 second<br>Rearm < 3 retries | Whether the management console has lost connectivity with |

-continued

| Network Interface | | |
|---|---|---|
| Object Property | Policy Condition | Description |
| | Polling Interval = 3 minutes<br>Warning:<br><br>Threshold > 2 retries<br>Duration = .8 seconds<br>Rearm < 2 retries<br>Polling Interval = 3 minutes | the managed<br>system due to<br><br>network failures<br>(e.g. analogous<br>to a ping of the<br>network<br>interface) |

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method for monitoring a system resource, comprising:
   setting collection properties of a collection object associated with the resource, the collection properties specifying information for collecting data from the resource;
   setting a threshold in association with the collection object, the threshold including threshold properties specifying information for evaluating the data collected from the resource;
   setting action data and throttling data of an action object, the throttling data determining when the action object will perform an action based on the action data in response to a status event provided by a threshold;
   collecting the data from the resource via the collection object;
   evaluating the data collected from the resource via the threshold properties of the threshold, and generating a status event when the evaluation indicates a threshold violation exists;
   receiving the status event at the action object, evaluating the throttling data and performing the action when the evaluation of the throttling data indicates the action is to be performed.

2. The method of claim 1, wherein the collection properties include a defined interval for how often to collect that data.

3. The method of claim 1, wherein the collection properties include a defined schedule for collecting the data.

4. The method of claim 1, wherein the collection properties include information as to where to collect the data.

5. The method of claim 1, wherein the collection properties include information as to how to collect the data.

6. The method of claim 5, wherein the information as to how to collect the data corresponds to collection of data via polling.

7. The method of claim 5, wherein the information as to how to collect the data corresponds to collection of data via event notification.

8. The method of claim 1, wherein the threshold properties include a threshold value.

9. The method of claim 1, wherein the threshold properties include information that specifies how to use the collected data.

10. The method of claim 1, wherein the threshold properties include condition information that specifies a test to apply to the collected data.

11. The method of claim 1, wherein the threshold properties include duration information.

12. The method of claim 1, further comprising, dynamically discovering the system resource.

13. The method of claim 1 wherein the resource has a data group object associated therewith.

14. The method of claim 1 wherein the data group object has another data group object hierarchically above it.

15. The method of claim 1 wherein collecting the data includes receiving an event.

16. The method of claim 1 wherein collecting the data includes polling for the data.

17. The method of claim 1 wherein collecting the data includes receiving information from a provider associated with the resource.

18. The method of claim 17 wherein the data is received in an object instance via an object manager communicating with the provider.

19. The method of claim 18 wherein collecting the data includes providing a query to the object manager.

20. The method of claim 18 wherein collecting the data includes calling a method of the object manager.

21. A computer readable medium having computer-executable instructions for performing the method of claim 1.

22. A computer-readable medium having stored thereon a data structure, comprising:
   a first data field representing a collection object associated with a resource, the collection object including collection properties that specify information for collecting data from the resource;
   a second data field representing a threshold object associated with the collection object, the threshold object including threshold properties that specify information for evaluating the data collected from the resource; and
   a third data field representing an action object, the action object defining action properties that specify throttling data and at least one action to perform when at least one of the threshold properties is achieved and the throttling data indicates that the action should be performed.

23. The computer-readable medium having stored thereon the data structure of claim 22, wherein the collection properties include a defined interval for collecting the data.

24. The computer-readable medium having stored thereon the data structure of claim 22, wherein the collection properties include a defined schedule for collecting the data.

25. The computer-readable medium having stored thereon the data structure of claim 22, wherein the collection properties include information specifying where to collect the data.

26. The computer-readable medium having stored thereon the data structure of claim 22, wherein the collection properties include information indicating how to collect the data.

27. The computer-readable medium having stored thereon the data structure of claim 26, wherein the information indicating how to collect the data indicates polling.

28. The computer-readable medium having stored thereon the data structure of claim 26, wherein the information indicating how to collect the data indicates event-based collection.

29. The computer-readable medium having stored thereon the data structure of claim 22, wherein the threshold properties include information that specifies how to use the collected data.

30. The computer-readable medium having stored thereon the data structure of claim 22, wherein the threshold properties include information specifying a test or condition to apply to the collected information.

31. The computer-readable medium having stored thereon the data structure of claim 22, wherein the threshold properties include duration information.

32. In a computer system, a method for monitoring a plurality of system resources, comprising:

grouping datagroup objects into a hierarchy, at least some of the datagroup objects representing resources;

attaching at least one action object to the hierarchy, each action object including property information that determines performance of an action when a status event reaches the action object;

associating a collection object with one of the datagroup objects representing a resource, the collection object including information for collecting data from the resource associated with the collection object;

associating a threshold object with the collection object, the threshold object including properties specifying information for evaluating the collected data and for sending a status event to towards the top of the hierarchy when the data evaluation indicates a threshold violation state;

collecting data from the resource via the collection object;

evaluating the data collected from the resource via the threshold object, determining a threshold violation state and sending a status event to towards the top of the hierarchy; and receiving the status event at an action object, and in response, selectively performing an action based on the property information of the action object.

33. The method of claim 32 wherein the action includes sending an e-mail.

34. The method of claim 32 wherein the action includes dialing a telephone number.

35. The method of claim 32 wherein the action includes writing to a file.

36. The method of claim 32 wherein the action includes executing a script.

37. The method of claim 32 wherein the action includes executing a command.

38. The method of claim 32 wherein the property information of the action object includes throttling data, and further comprising, determining whether to perform the action based on the throttling data.

39. A computer readable medium having computer-executable instructions for performing the method of claim 32.

40. In a computing environment, a system comprising:

a plurality of datagroup objects arranged in a hierarchy, at least some of the datagroup objects associated with a computing resource;

a plurality of collection objects, each collection object corresponding to a resource and having code that when executed collects data related to its corresponding resource;

a plurality of threshold objects, each threshold object corresponding to a collection object and having code that when executed evaluates the data collected by its corresponding collection object against threshold property data to determine whether a threshold violation exists, and generates a status event when a threshold violation exists, the status event sent towards the top of the hierarchy; and a plurality of action objects, each action object placed in the hierarchy to receive status events, each action object having code that when executed determines performance of an action based on action property data in the action object.

41. The system of claim 40, wherein each collection object includes collection properties comprising at least one of: a defined interval for how often to collect that data, a defined schedule for collecting the data, information as to where to collect the data, or information as to how to collect the data.

42. The system of claim 41, wherein the information as to how to collect the data corresponds to collection of data via polling.

43. The system of claim 41, wherein the information as to how to collect the data corresponds to collection of data via event notification.

44. The system of claim 40, wherein the threshold property data include at least one of: a threshold value, information that specifies how to use the collected data, condition information that specifies a test to apply to the collected data, or duration information.

45. The system of claim 40, further comprising, dynamically discovering the computing resource.

46. The system of claim 40 wherein the action property data in the action object comprises throttling data that conditionally prevents performance of the action.

47. The system of claim 40 wherein the collection object collects data related to its corresponding resource based on receiving an event.

48. The system of claim 40 wherein the collection object collects data related to its corresponding resource by polling for the data.

49. The system of claim 40 wherein the collection object collects data by receiving information from a provider associated with the resource.

50. The system of claim 40 wherein the collection object collects data by providing a query to an object manager.

51. The system of claim 40 wherein the collection object collects data by calling a system of the object manager.

52. The system of claim 40 wherein the action object performs an action including sending an e-mail.

53. The system of claim 40 wherein the action object performs an action including dialing a telephone number.

54. The system of claim 40 wherein the action object performs an action including writing to a file.

55. The system of claim 40 wherein the action object performs an action including executing a script.

56. The system of claim 40 wherein the action object performs an action including executing a command.

* * * * *